US010891342B2

(12) United States Patent
Carter

(10) Patent No.: US 10,891,342 B2
(45) Date of Patent: Jan. 12, 2021

(54) CONTENT DATA DETERMINATION, TRANSMISSION AND STORAGE FOR LOCAL DEVICES

(71) Applicant: Google Inc., Mountain View, CA (US)

(72) Inventor: Bernadette Alexia Carter, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 647 days.

(21) Appl. No.: 15/405,131

(22) Filed: Jan. 12, 2017

(65) Prior Publication Data
US 2018/0196880 A1 Jul. 12, 2018

(51) Int. Cl.
G06F 16/9535 (2019.01)
H04L 29/08 (2006.01)
G06F 16/9537 (2019.01)
G06Q 10/06 (2012.01)

(52) U.S. Cl.
CPC ...... G06F 16/9535 (2019.01); G06F 16/9537 (2019.01); G06Q 10/06312 (2013.01); G06Q 10/06375 (2013.01); H04L 67/18 (2013.01)

(58) Field of Classification Search
CPC ............................. G06F 16/9535; G06F 3/016
See application file for complete search history.

(56) References Cited

U.S. PATENT DOCUMENTS

| 4,746,993 | A  | 5/1988  | Tada        |
|-----------|----|---------|-------------|
| 6,122,411 | A  | 9/2000  | Shen et al. |
| 6,967,675 | B1 | 11/2005 | Ito et al.  |
| 7,437,725 | B1 | 10/2008 | Chang et al.|
| 7,640,406 | B1 | 12/2009 | Hagerstrom et al. |
| 8,117,303 | B2 | 2/2012  | Fonsen      |
| 8,385,950 | B1 | 2/2013  | Wagner et al. |

(Continued)

FOREIGN PATENT DOCUMENTS

| CN | 101084665 | 12/2007 |
|----|-----------|---------|
| CN | 102591913 | 7/2012  |

(Continued)

OTHER PUBLICATIONS

PCT, Written Opinion for International Patent Application No. PCT/US2017/057040, dated Apr. 10, 2018, 6 Pages.

(Continued)

Primary Examiner — Mariela Reyes
Assistant Examiner — Courtney Harmon
(74) Attorney, Agent, or Firm — IP Spring

(57) ABSTRACT

Implementations relate to content data determination, transmission, and storage for local devices. In some implementations, a computer-implemented method includes determining an event for a user based on user data associated with the user, and includes programmatically analyzing the user data having one or more references to at least one of persons, locations, and scheduled activities. The method determines a set of content items to be accessed at the event, where one or more content items of the set are determined based on the user data, and the set of content items includes content data related to the event. Prior to a time of the event, the set of content items are transmitted over a communication network from network storage to local device(s) associated with the user, where the content items are stored in local storage of the local device(s).

20 Claims, 8 Drawing Sheets

(56) References Cited

U.S. PATENT DOCUMENTS

| | | |
|---|---|---|
| 2002/0099807 A1 | 7/2002 | Doyle |
| 2003/0097418 A1 | 5/2003 | Yajima |
| 2003/0151982 A1 | 8/2003 | Brewer et al. |
| 2004/0090539 A1 | 5/2004 | Kim et al. |
| 2005/0243020 A1 | 11/2005 | Steeb et al. |
| 2006/0069742 A1 | 3/2006 | Segre |
| 2007/0147769 A1 | 6/2007 | Nagaoka et al. |
| 2007/0169125 A1 | 7/2007 | Qin |
| 2007/0220220 A1 | 9/2007 | Ziv et al. |
| 2008/0064377 A1 | 3/2008 | Mori |
| 2008/0106601 A1 | 5/2008 | Matsuda |
| 2008/0250024 A1 | 10/2008 | Kvm et al. |
| 2009/0086271 A1 | 4/2009 | Shiokawa |
| 2009/0182836 A1 | 7/2009 | Aviles et al. |
| 2010/0077174 A1 | 3/2010 | Ma et al. |
| 2010/0174790 A1 | 7/2010 | Dubs et al. |
| 2012/0016838 A1 | 1/2012 | Arai et al. |
| 2012/0226663 A1 | 9/2012 | Valdez et al. |
| 2013/0227082 A1 | 8/2013 | Lin |
| 2014/0032666 A1 | 1/2014 | Chan et al. |
| 2014/0032833 A1 | 1/2014 | Cudak et al. |
| 2014/0129627 A1 | 5/2014 | Baldwin et al. |
| 2014/0156793 A1 | 6/2014 | Chan et al. |
| 2014/0181443 A1 | 6/2014 | Kottomtharayil et al. |
| 2014/0192228 A1 | 7/2014 | Lee |
| 2014/0300769 A1 | 10/2014 | Hartford |
| 2014/0337327 A1 | 11/2014 | Barton |
| 2015/0040022 A1 | 2/2015 | Pippuri et al. |
| 2015/0186092 A1 | 7/2015 | Francis et al. |
| 2015/0301903 A1* | 10/2015 | Mutha ............ G06F 11/1453 707/692 |
| 2015/0341561 A1 | 11/2015 | Petrescu et al. |
| 2015/0373181 A1 | 12/2015 | Rahman et al. |
| 2016/0125426 A1* | 5/2016 | Francolla ............ G06Q 30/0252 705/7.29 |
| 2016/0140702 A1 | 5/2016 | Kindle et al. |
| 2016/0192178 A1 | 6/2016 | Blong et al. |
| 2016/0234293 A1 | 8/2016 | Berger et al. |
| 2016/0315902 A1* | 10/2016 | Silva ............ H04W 4/21 |
| 2016/0373270 A1 | 12/2016 | Yang et al. |
| 2017/0031449 A1* | 2/2017 | Karsten ............ G06Q 10/109 |
| 2018/0115170 A1* | 4/2018 | Bacarella ............ H02J 7/0027 |
| 2018/0191797 A1* | 7/2018 | Javier ............ G06F 40/174 |

FOREIGN PATENT DOCUMENTS

| | | |
|---|---|---|
| CN | 103533152 | 1/2014 |
| EP | 2397938 | 12/2011 |
| JP | 2003-150417 | 5/2003 |
| JP | 2014/044268 | 3/2014 |
| WO | 2011/148496 | 12/2011 |
| WO | 2014/030307 | 2/2014 |
| WO | 2015/200339 | 12/2015 |

OTHER PUBLICATIONS

USPTO, Non-Final Office Action in U.S. Appl. No. 15/980,309, dated Jul. 27, 2018, 11 pages.

USPTO, Supplemental Notice of Allowance for U.S. Appl. No. 14/747,677, dated Jun. 4, 2018, 2 Pages.

CNIPA, First Office Action (with English translation) for Chinese Patent Application No. 201580034436.5, dated Oct. 22, 2018, 13 pages.

USPTO, Final Office Action for U.S. Appl. No. 15/980,309, dated Dec. 18, 2018, 15 pages.

EPO, Written Opinion of the International Preliminary Examining Authority for International Patent Application No. PCT/US2017/057040, dated Apr. 10, 2018, 6 pages.

USPTO, Notice of Allowance for U.S. Appl. No. 14/747,677, dated Feb. 15, 2018, 17 pages.

Facebook Business, "Testing a New Way for Marketers to Tell Stories in News Feed", Facebook, Dec. 17, 2013, 9 pages.

Popper, "YouTube Music is here, and it's a game changer", The Verge, http://www.theverge.com/2015/11/12/9723496/youtube-music-app-offline-background, Nov. 12, 2015, 8 pages.

Stobing, et al., "How to Use Google Drive Offline on a Desktop or Mobile Device", How-To Geek, http://www.howtogeek.com/227032/how-to-use-google-drive-offline-on-a-deskop-or-mobile-device/, Aug. 31, 2015, 6 pages.

EPO, International Search Report for International Patent Application No. PCT/US2017/057040, dated Nov. 28, 2017, 5 pages.

EPO, Written Opinion for International Patent Application No. PCT/US2017/057040, dated Nov. 28, 2017, 7 pages.

JPO, Decision of Rejection (with English translation for Japanese Patent Application No. 2016-572644, dated Sep. 10, 2018, 7 pages.

JPO, Notice of Allowance in Japanese Application No. 2016-572644, dated Feb. 4, 2019, 3 pages.

CNIPA, Notification of Second Office Action in Chinese Application No. 201580034436.5, dated Mar. 22, 2019, 33 pages.

USPTO, Notice of Allowance in U.S. Appl. No. 15/980,309, dated Apr. 11, 2019, 16 pages.

KIPO, Notice of Preliminary Rejection for Korean Patent Application No. 10-2016-7035805, dated Oct. 16, 2017, 11 pages.

WIPO, International Preliminary Report on Patentability for International Patent Application No. PCT/US2015/037211, dated Dec. 27, 2016, 13 pages.

JPO, Notice of Reasons for Rejection for Japanese Patent Application No. 2016-572644, dated Jan. 15, 2018, 5 pages.

"No Strings Attached: Sleek, Connected and Cloud-Based Action Video Camera Launches in US", iON USA, https://usa.ioncamera.com/no-strings-attached-sleek-connected-and-cloud-based-action-video-camera-launches-in-us/, downloaded Sep. 2, 2015, May 22, 2012, 5 pages.

USPTO, Non-Final Office Action for U.S. Appl. No. 14/747,677, dated Nov. 3, 2017, 10 pages.

EPO, Written Opinion for International Patent Application No. PCT/US2015/037211, dated Sep. 18, 2015, 12 pages.

EPO, International Search Report for International Patent Application No. PCT/US2015/037211, dated Sep. 18, 2015, 5 pages.

USPTO, First Action Interview, Pre-Interview Communication for U.S. Appl. No. 15/161,128, dated Sep. 11, 2017, 7 pages.

USPTO, First Action Interview, Office Action Summary for U.S. Appl. No. 15/161,128, dated Dec. 11, 2017, 8 pages.

CNIPA, Notification of Third Office Action in Chinese Application No. 201580034436.5, dated Aug. 12, 2019, 36 pages.

WIPO, International Preliminary Report on Patentability for International Patent Application No. PCT/US2017/057040, dated Jul. 16, 2019, 6 pages.

EPO, Communication pursuant to Article 94(3) EPC in European Application No. 15736101.5, dated Nov. 27, 2019, 6 pages.

CNIPA, Notification of Grant in Chinese Application No. 201580034436.5, dated Dec. 3, 2019, 4 pages.

\* cited by examiner

CONTENT DATA DETERMINATION, TRANSMISSION AND STORAGE FOR LOCAL DEVICES

BACKGROUND

The popularity and convenience of digital mobile devices as well as the widespread of use of Internet communications have caused user-produced content such as digital photographs, videos, audio or music, messages, documents, etc. to become ubiquitous. For example, a large number of users are storing and accessing content via online services and repositories, where a user's mobile device can connect to the servers to access the user's content using wireless communication.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of the present application relate to content data determination, transmission, and storage for local devices. In some implementations, a computer-implemented method includes determining a predicted event for a user, where determining the predicted event is based on user data associated with the user and includes programmatically analyzing the user data having one or more references to at least one of persons, locations, and scheduled activities. The method determines a set of content items to be accessed at the predicted event, where one or more content items in the set of content items are determined based on the user data, and the set of content items includes content data related to the predicted event. Prior to a time of the predicted event, the method transmits the set of content items over a communication network from network storage to at least one local device associated with the user, where the set of content items are stored in local storage of the at least one local device.

Various implementations and examples of the method are described. For example, in some implementations, the predicted event is associated with a location where access to the network storage by devices is restricted. In some examples, the network storage is geographically distant from the one or more local devices. In some implementations, determining the predicted event includes determining a particular geographic location for the event, and/or determining a particular time period for the event. In some examples, determining the predicted event includes obtaining the user data that includes calendar data of a calendar of the user, location data indicating one or more geographic locations associated with the user, messages sent by the user and including information related to one or more activities of the user, social data indicating one or more persons having a social connection to the user, and/or one or more images or videos shared by the user to one or more other users. In some examples, the references to at least one of persons, locations, and scheduled activities includes calendar information included in a calendar and referring to a time period used to determine a time period of the predicted event.

In further examples, the method further includes determining one or more persons to be attending the predicted event based on the user data. For example, the set of content items includes at least one content items associated with the user and which has one or more characteristics associated with the one or more persons determined to be attending the predicted event. In some implementations, determining the set of content items includes determining at least one content item that has not been previously communicated to the one or more persons determined to be attending the predicted event. Some examples determine the set of content items by determining one or more images having one or more detected image features related to the predicted event. In some examples, the method determines one or more content items having content associated with a time period of the predicted event.

In still further examples, the method further includes determining rankings for a plurality of accessible content items based on a relevance to the predicted event, and selecting at least one content item ranking above a threshold for inclusion in the set of content items. In some implementations, the at least one local device is a plurality of local devices, and the storage distribution of the set of content items is determined among respective local storage of the plurality of local devices. In some implementations, the method further includes retaining the set of content items in the local storage of the at least one local device for at least a duration of the predicted event, and, after the predicted event, designating the set of content items for removal from the local storage.

In some implementations, a device includes a memory and at least one processor configured to access the memory and configured to perform operations including determining a predicted event for a user, where determining the predicted event is based on user data associated with the user and includes programmatically analyzing the user data. The operations include determining a set of content items to be accessed at the predicted event, where the set of content items includes content data related to the predicted event. The operations include determining a plurality of local devices to store the set of content items, and determining a storage distribution of the set of content items among respective local storage of the plurality of local devices. The operations include, prior to a time of the predicted event, transmitting the set of content items over a communication network from network storage, where the set of content items is stored in the respective local storage of the plurality of local devices based on the storage distribution.

Various implementations and examples of the device are described. For example, in some implementations, the processor determines a plurality of local devices including ranking multiple local devices accessible to the user and selecting the plurality of local devices as the highest ranking local devices of the multiple local devices. In some implementations, the at least one processor determining the storage distribution of the set of content items includes determining a particular type of local device to store one or more content items of the set of content items based on a respective type of the one or more content items. In some examples, the operations further include sending information to one or more local devices of the plurality of local devices to cause a notification to be output by the one or more local devices, where the notification indicates that the plurality of local devices have stored thereon the set of content items. In some implementations, the at least one processor is further configured to perform operations comprising sending a request to the plurality of local devices for device information indicating a respective local storage capacity of the plurality of local devices, and receiving, from the plurality of local devices, the device information indicating a respective local storage capacity of the plurality of local devices, where determining the plurality of local devices and determining the storage distribution are based on the received device information.

In some implementations, a non-transitory computer readable medium has stored thereon software instructions that, when executed by a processor, cause the processor to perform operations. The operations include determining a predicted event for a user, where determining the predicted event is based on user data associated with the user. The operations include determining a set of content items to be accessed at the predicted event, where the set of content items includes content data related to the predicted event. The operations include, prior to a time of the predicted event, retrieving the set of content items over a communication network from network storage, and storing the set of content items in local storage of at least one local device associated with the user. The operations include retaining the set of content items in the local storage of the at least one device for at least a duration of the predicted event, and designating the set of content items to be eligible for removal from the local storage after the predicted event. Various implementations and examples of the computer readable medium are described.

DETAILED DESCRIPTION

Figure 1:
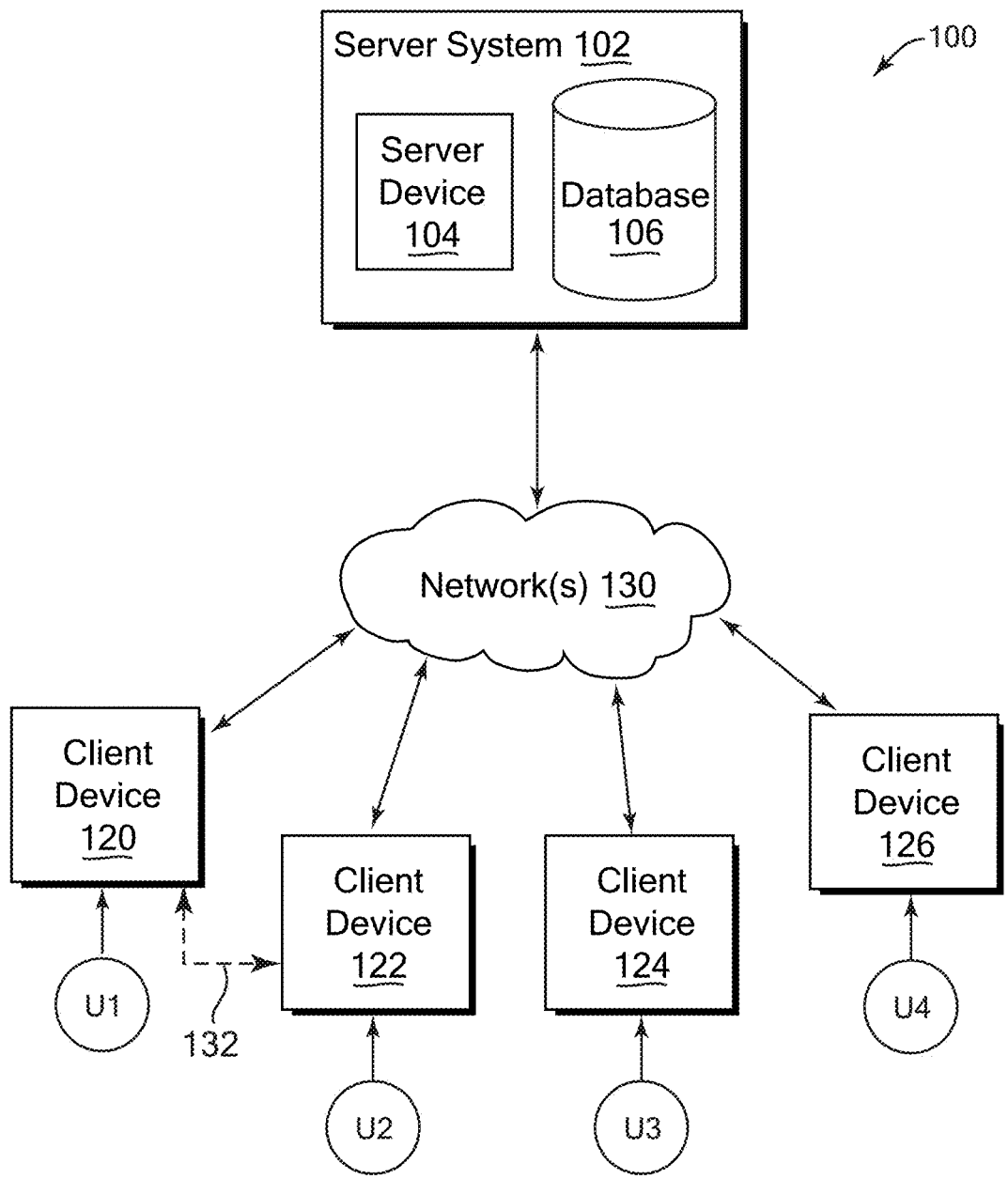
FIG. 1 is a block diagram of example systems and a network environment which may be used for one or more implementations described herein.

One or more implementations described herein relate to content data determination, transmission, and storage for local devices. In some implementations, an upcoming, predicted event for a user is determined based on programmatically analyzing user data, e.g., data having references to persons, locations, scheduled activities, and/or topics related to the predicted event. For example, the predicted event can be associated with a particular geographic location and/or a particular time period (e.g., date and time, e.g., including a start time, a duration, or an end time). A set of content items is determined, such as images, videos, audio clips, documents, etc., where the set of content items is to be accessed at the predicted event. One or more content items in the set of content items are determined based on user data, and the set of content items includes content data related to the predicted event. Prior to a time of the predicted event, the set of content items is transmitted over a communication network from network storage to at least one local device associated with the user, where the set of content items are stored in local storage of the at least one local device.

Various other features are described. For example, the predicted event may be determined to be associated with a location where access to the network storage by devices at the location is restricted, e.g., where there is lack of, intermittent, restricted, or reduced access to wireless network communication. A predicted event can be determined from the user data that may include calendar data of a calendar of the user, location data indicating one or more geographic locations associated with the user, messages sent by the user and including information related to one or more activities of the user, social data indicating one or more persons having a social connection to the user, and one or more content items shared by the user to one or more other users. One or more persons can be determined as likely to be attending the predicted event based on the user data. In some implementations, known public events can be determined that are not based on user data.

The content items determined for the transmission to the local device can be determined in a variety of ways. For example, the content items can have one or more characteristics associated with the persons likely to be attending the predicted event. The content items may have previously not been communicated to the persons. The content items can include one or more images or videos having one or more detected image features related to the predicted event. The content items can include content associated with a time period of the predicted event. In some examples, rankings of accessible content items can be based on a relevance to the predicted event, and content items having the highest rankings (e.g., ranking above a threshold) are selected for inclusion in the set of content items to be transmitted to the local device. In some implementations, topics of interest can be determined that are common to the user and to other persons who will attend the predicted event, and content items can be selected which include or are associated with the common topics of interest. In some implementations, content items can be public content items determined based on a predicted event, or based on general popularity of the content items or of known associated public events.

In some implementations, the system determines a plurality of local devices (e.g., associated with the user) and determines a storage distribution of a set of content items from network storage to respective local storage of the local devices. For example, multiple local devices accessible to the user can be ranked and the highest ranking local devices selected (e.g., the local devices ranking above a threshold). The ranking of devices can be based on available local storage, frequency of device use by the user, etc. The storage distribution of content items can be determined based on the types of local devices, types of content items, user preferences, etc. The set of content items can be retained in the local storage of the local device(s) for at least a duration of the predicted event, and after the predicted event, the set of content items can be designated for removal from the local storage.

One or more features described herein allow a user's content data items that are relevant to the user's current context to be available for access on a user's device in local storage of the device. For example, many users store a large portion of their content items on online network storage accessible via the Internet, which offers large amounts of storage capacity, consolidated organization of content items, and convenient access to the stored content items from any device that can access the network storage. However, the network storage may not be available or accessed reliably or easily by devices at particular times or locations, e.g., in remote areas far from network transmission nodes, areas having poor wireless signal reception, areas in which networks are reduced in performance due to high volume of traffic or technical problems, etc. Or access to the network storage may be reduced by being restricted due to high cost of access, e.g., on airplane flights, during international travel, after a user has downloaded a monthly allocation of data, etc. Described features allow a user's network-stored content items to be accessible on a device regardless of whether communication networks are available to the device or reliable, e.g., in contexts having reduced access to a network, such as unavailable (or otherwise offline), intermittent, unreliable, or costly access. For example, a portion of a user's content items normally stored in network storage can be downloaded to local storage of one or more local devices of the user prior to a particular event while network communication is functional and reliable, and these content items are accessible to the user later during an event in which the network storage may be offline, intermittent, or unreliable.

Features described herein permit users to display or otherwise output content items from local device storage, where the content items have been predicted to be relevant to the user and/or relevant to the predicted event. For example, content items that are determined to be relevant to the location or activity of the predicted event or to one or more persons meeting the user at the predicted event can be stored in local storage. The relevance of content items can be determined based on a variety of accessible data related to the user and the user's devices, if the user has provided consent. A user can thus, for example, show relevant content items to other persons at the event using a local device, or otherwise access relevant content items, without concern about network availability.

Furthermore, one or more features allow constraints on the storing of content items on a local device to be mitigated. For example, if multiple devices are available to the user at the predicted event, content items can be stored on multiple devices if sufficient storage is not available on one device to store determined content items and/or if device capabilities are poor for outputting one or more of the determined content items. Features allow content items stored on multiple local devices to be accessed by a user using one of the local devices.

Described features therefore can provide storage of content items on local devices in an effective, efficient, and relevant manner. Content items that are transmitted for local storage are determined to be relevant to the user's context. Described techniques allow reduction or avoidance of the problem of reduced (e.g., unavailable, intermittent, restricted, costly, etc.) access to a user's network-stored content items in various contexts. Described features allow automatic storage of content items to local devices, without manual intervention by the user, thus reducing or avoiding burdensome tasks of manually selecting content items and copying them to local devices, or removing content items that may no longer be relevant.

Consequently, a technical effect of one or more described implementations is that content items relevant to a user's current context and normally stored on network storage are accessible to the user on a local device when network access is unavailable or unreliable. An additional technical effect of one or more described implementations is that relevant content items are stored on local devices automatically and thus local storage of content is achieved with less computational time and resources expended as compared to devices using conventional manual techniques. For example, a user using a system having described techniques does not have to expend computational resources in manually reviewing, selecting, and copying content items from network storage to local storage. An additional technical effect of described features is a reduction in the consumption of system processing resources utilized to store content items on local devices as compared to a system that does not provide one or more of the described features. For example, described features provide content items relevant to a user's context and therefore avoid wasteful expenditure of computational resources used in conventional systems in which a user must manually delete content items that are not relevant and must command additional transmission of manually-selected content items. An additional technical effect is that the local storage capacity of the one or more local devices is allocated to store content items that are determined to be likely of interest to the user (e.g., more targeted to a predicted event), and therefore, content items may be provided to the user without need of a large local storage capacity. An additional technical effect of one or more described implementations is that a greater number of content items can be stored in local device storage on multiple devices as compared to conventional systems using a single local device for local storage.

In situations in which certain implementations discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with a network 130, for example.

Server system 102 can include a server device 104 and a database 106 or other storage device. Network environment 100 can also include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication 132 between devices, e.g., using peer-to-peer wireless protocols.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In some examples, database 106 and/or other storage devices can be provided in server system block(s) that are separate from server device 104 and can communicate with server device 104 and other server systems via network 130. Also, there may be any number of client devices. Each client device can be any type of electronic device, e.g., a desktop computer, laptop computer, portable device (e.g., handheld), cell phone, smart phone, tablet computer, television, TV set top box or entertainment device, wearable devices (e.g., display glasses or goggles, head-mounted display (HMD), wristwatch, headset, armband, jewelry, etc.), virtual reality (VR) and/or augmented reality (AR) enabled devices, personal digital assistant (PDA), media player, game device, appliance, etc. A client device can be a mobile device that can be any handheld or wearable device. A client device may have local storage. Some client devices may also have a local database similar to database 106 or other storage. In other implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some example implementations, users U1, U2, U3, and U4 may interact with each other via applications running on respective client devices and/or server system 102. Client devices (and server devices) can access database 106 and/or other databases and storage devices over the communication network 130 as network storage. In some implementations, interaction between client devices may be performed via a network service, e.g., a social network service or other type of network service implemented on server system 102. For example, respective client devices 120, 122, 124, and 126 may communicate data to and from one or more server systems (e.g., server system 102). In some implementations, server system 102 may provide appropriate data to the client devices such that each client device can receive communicated content or shared content uploaded to the server system 102 and/or network service. In some examples, the users can interact via audio or video conferencing, audio, video, or text chat, or other communication modes or applications. In some examples, the network service can include any system allowing users to perform a variety of communications, form links and associations, upload and post shared content such as images, video, audio data, and other types of content, receive various forms of data, and/or perform socially-related functions. For example, the network service can allow a user to send messages to particular or multiple other users, form social links in the form of associations to other users within the network service, group other users in user lists, friends lists, or other user groups, post or send content including text, images, video sequences, audio sequences or recordings, or other types of content for access by designated sets of users of the network service, participate in live video, audio, and/or text video-conferences or chat with other users of the service, etc. In some implementations, a "user" can include one or more programs or virtual entities, as well as persons that interface with the system or network.

One or more user interfaces can enable display of content data items including images (e.g., digital images having pixels), video data (e.g., describing multiple video images or frames), documents, and other content as well as output of other content items (e.g., audio from audio data), and/or enable communication data, privacy settings, notifications, and other data on a client device 120, 122, 124, and 126 (or alternatively on server system 102). Such an interface can be displayed using software on the client device, software on the server device, and/or a combination of client software and server software executing on server device 104, e.g., application software or client software in communication with server system 102. The user interface can be displayed by a display device of a client device or server device, such as one or more display screens, projectors, etc. In some implementations, application programs running on a server system can communicate with a client device to receive user input at the client device and to output data such as visual data, audio data, etc. at the client device.

In some implementations, server system 102 and/or one or more client devices 120-126 can provide a display application. The display application may allow a user device to output content items such as display images and videos and output audio based on audio data. The application can allow a device to output various data, e.g., display video, images, text, and other data and output audio received by the client device running the application, where the video, images, and audio can be obtained from local storage and/or remote storage and/or over the network 130. In some implementations, an editing application can provide an associated user interface that is displayed on a display device associated with the server system or client device. The user interface may provide various display functions (e.g., display modes) for content items as well as editing functions. In some implementations, the user interface can receive user input that allows display and editing features.

Various implementations of some features described herein can use any type of system and/or service. For example, photo collection services, communication (e.g., chat) services, or other networked services (e.g., connected to the Internet) can be used. Any type of electronic device can make use of features described herein. Various implementations can provide features described herein on client or server devices disconnected from or intermittently connected to computer networks. In some examples, a client device including or connected to a display device can process and display data stored on storage devices local to the client device (e.g., not connected via a communication network) and can provide one or more features and results as described herein that are viewable to a user.

Figure 2:
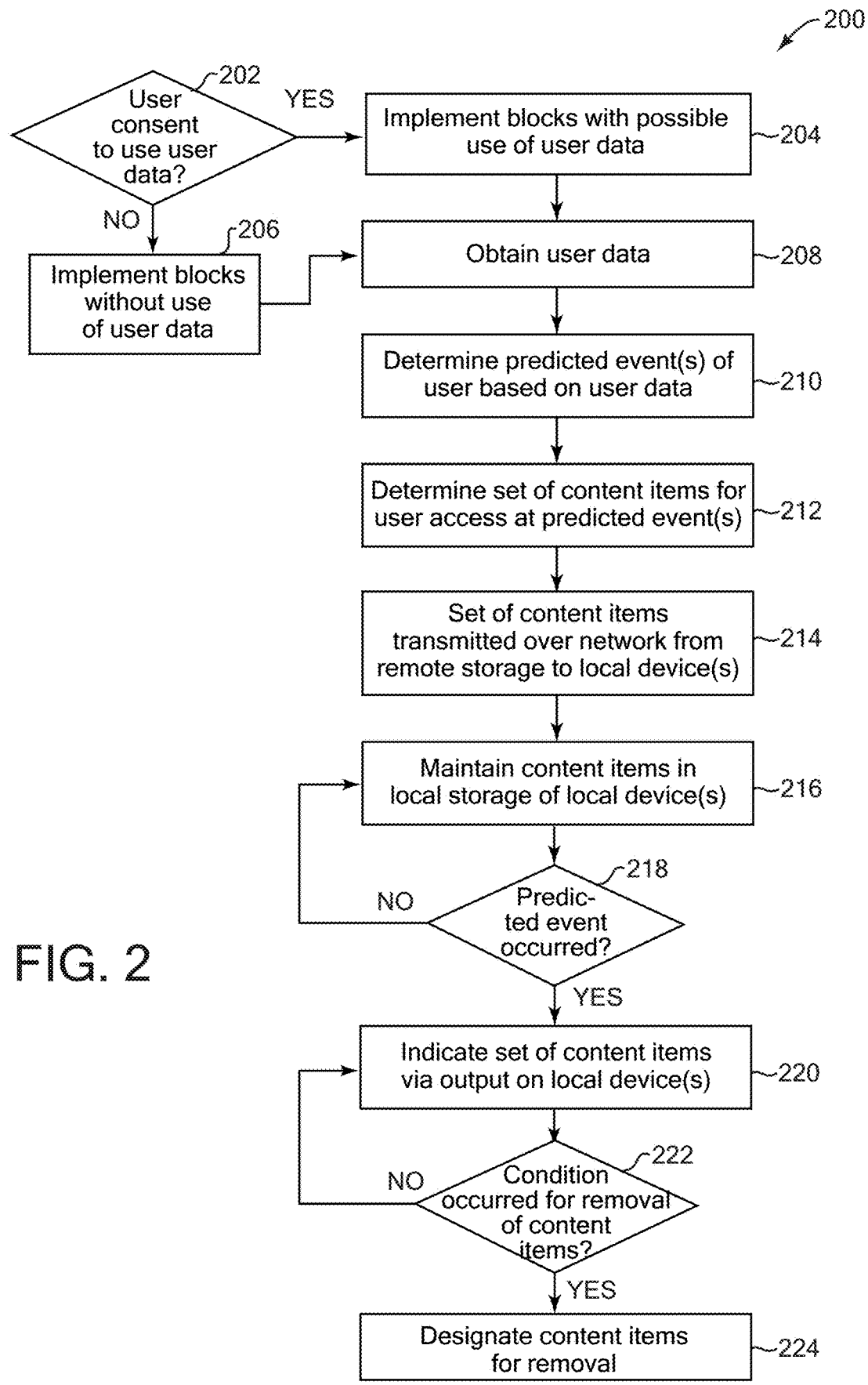
FIG. 2 is a flow diagram illustrating an example method to provide local storage of content items based on predicted events, according to some implementations.

FIG. 2 is a flow diagram illustrating an example method 200 to provide local storage of content items based on predicted events. In some implementations, method 200 can be implemented, for example, on a server system 102 as shown in FIG. 1. For example, in some implementations, some or all of the method 200 can be implemented on a system such as one or more client devices 120, 122, 124, or 126 as shown in FIG. 1, and/or on both a server system and one or more client systems. In some implementations, different components of one or more servers and/or clients can perform different blocks or other parts of the method 200. In some implementations, portions of method 200 can be implemented on a server system and other portions of method 200 can be implemented on one or more client devices. In described examples, the implementing system includes one or more hardware processors and/or processing circuitry, and one or more storage devices such as a database 106 or other accessible storage.

In block 202, it is checked whether user consent (e.g., user permission) has been obtained to use user data in the implementation of method 200. For example, user data can include user preferences, user biometric information, user characteristics (identity, name, age, gender, profession, etc.), information about a user's social network and contacts, social and other types of actions and activities, content, ratings, and opinions created or submitted by a user, a user's current location, historical user data, and/or various other types of data as described herein. One or more blocks of the methods described herein may use such user data in some implementations. If user consent has been obtained from the relevant users for which user data may be used in the method 200, then in block 204, it is determined that the blocks of the methods herein can be implemented with possible use of user data as described for those blocks, and the method continues to block 208. If user consent has not been obtained, it is determined in block 206 that blocks are to be implemented without use of user data, and the method continues to block 208. In some implementations, if user consent has not been obtained, the method 200 is discontinued, or, alternatively, blocks are to be implemented without use of user data and, e.g., with generic or publicly-usable data.

In block 208, user data is obtained, if user consent for obtaining the user data has been obtained. The user data can include any or all of various different types of data that may be accessible. For example, the user data can include calendar data which can be provided in one or more stored calendars, schedules, and/or other formats implemented on a user device of the user. In some examples, the calendar data specifies or indicates scheduled activities, e.g., past and/or future activities (including events). In some cases, the user has been or is scheduled to attend or perform the activities. Such scheduled activities can include meetings with other persons, business or entertainment events, etc. In various implementations, the user may have manually input data to a calendar or schedule, and/or some data can be auto-generated by the system, e.g., a meeting held every week at the same time. Calendar data can include a to-do list showing various tasks the user is intending to perform at specified upcoming dates and times. In some examples, calendar data for scheduled activities can specify a location at which an activity is to take place, a time (e.g., time of day, date, etc.), names of persons involved in an activity, and/or a description of an activity.

Another example of user data that can be obtained is message data, which can include messages sent and/or received from other or network services, if participating users' consent has been obtained. The message data can be data from messages in a variety of forms, including email, instant messages, chat messages, text messages (e.g., SMS), messages communicated using an application on a user device, etc. The message data can include various topics communicated by the user, including upcoming activities (their times, subjects, locations, etc.), persons to be involved in the activities, etc. Another example of user data that can be obtained is social data stored on a social network service, e.g., data describing content, comments on other content, ratings (e.g., a rating within a rating scale, approval or disapproval of other content available on a social network service, etc.), content provided by the user on the social network service (e.g., images, videos, audio data, documents, text, etc.). Social data can also include data describing one or more social connections of the user, e.g., a social graph indicating users and user groups with which the user communicates, follows postings and updates, etc.

Another example of user data that can be obtained is historical user data describing previous actions the user has taken in the past using one or more user devices, including the time when the previous actions occurred. In some examples, the previous actions can include sharing content items (e.g., images, videos, web links, etc.) with other users over a communication network so that the other users receive or gain access to the content items using their devices, receiving content items from other users, opening and viewing content items on one or more user devices, creating and deleting content items (e.g., from storage of one or more user devices or of servers or network services), modifying or editing content items, commenting on and rating content items, etc.

Another example of user data that can be obtained is location data. For example, location data can describe a geographic location the user will be traveling to, e.g., as specified in a mapping application program or other application, a stored travel itinerary, etc. Location data can also describe a geographic location the user has traveled to previously, including the time at which the user was present at the location. In some implementations, location data can be associated with content items, e.g., as metadata. For example, an image captured with a camera device at a location can specify the location (e.g., as coordinates, place name, or other data) in metadata, as well as a timestamp indicating when the image was captured at that location.

Some implementations can obtain other types of user data, or other data not associated with the user (e.g., publicly-accessible data provided by an institution for a generic viewership). The method continues to block 210.

In block 210, one or more predicted events for the user are determined based on the user data obtained in block 208. These can be upcoming events predicted or anticipated by the system. For example, the predicted events can include one or more meetings with other persons and/or other activities of the user at an upcoming time. Some implementations can constrain the predicted events to within particular time range extending in the future from the current time, and/or a particular time period in the future (e.g., a particular week or month). For example, in some implementations or cases, a predicted event can be defined to include a start time, a duration, and/or an end time. The predicted events can be determined by checking for particular types of data in the obtained user data, e.g., times and dates, names of persons, locations, particular keywords and key phrases, words semantically similar to particular words, etc. Some examples of determining predicted events for the user are described below with respect to FIG. 3. The method continues to block 212.

In block 212, a set of content data items (e.g., "content items") is determined for access by the user at the one or more predicted events. In some implementations, a respective set of content items can be determined for each predicted event that has been determined. The content items are content data that may have been determined to be of likely interest to the user at the predicted events, and which can be stored on local storage of one or more user devices local to the user ("local devices") such that if online or wireless access is constrained or restricted, these content items will still be available for access by the user. In some implementations, a server can be used to determine the set of content items, while in other implementations, a client device (e.g., local device) can be used to determined the set of content items. Some examples of determining the set of content items are described below with respect to FIG. 4. The method continues to block 214.

In block 214, the set of content items is transmitted over a communication network from remote storage to local storage of one or more local user devices accessible by the user. Remote storage can be network storage that is not in the immediate vicinity of the user, e.g., storage provided over the internet or other wide area network (WAN) on server systems. Local storage can be storage included in the housing of a local device (e.g., memory or hard drive), external storage connected to a local device via a bus (e.g., external hard drive), or other storage not requiring Internet or WAN network access by the local device. In some implementations, local storage can include storage accessible to a local device over a wireless local area network (LAN), e.g., using an 802.11 protocol and without requiring Internet network access. For example, a remote network system (e.g., server system or other client device) can send the set of content items to one or more local devices (e.g., one or more client devices). The transmission of the set of content items can be performed prior to a time of the predicted event, e.g., before the predicted event is initiated, at a time in the middle of the predicted event, or before the predicted event is over, to allow access to the set of content items via local storage by the one or more local devices during at least a portion of the duration of the predicted event.

The local devices can be any device accessible to the user, including mobile devices owned by the user, other devices accessible by the user or by the user's other local devices (e.g., wireless access points, storage devices (e.g., external hard drives or memory), network devices (routers, hubs, etc.), appliances, display devices, etc. The set of content items are stored in local storage of the one or more local devices that received the set of content items. For example, the set of content items can be stored in memory (e.g., volatile or non-volatile memory) or other storage devices of the one or more local devices. In some implementations, the set of content items can be sent to one or more local devices based on various criteria or conditions, some examples of which are described with respect to FIG. 5. The method continues to block 216.

In block 216, the set of content items is maintained in the local storage of the one or more local devices. For example, the set of content items is not overwritten with other data over time. In some implementations, e.g., if content items or other data having a higher priority than the stored content items is received, the set of content items can be completely and/or partially overwritten by the higher priority data, and the set of content items can be re-transmitted for storage, and/or the set of content items can be determined and transmitted again in blocks 208-214. The set of content items can be accessed and displayed or otherwise output by the storing local device(s) while the content items are stored in the local storage.

In some implementations, one or more additional predicted events may have been determined in further iterations of blocks 208-216 to cause additional sets of content items to be transmitted to local storage of the user device(s) before the previous predicted event has occurred for the stored set of content items. In some implementations, if there is no additional storage space available for the additional sets of content items, the already-stored set of content items can have priority, such that the additional set(s) of content items are not stored in local storage and, e.g., are not transmitted in block 214 or are transmitted and discarded. In some cases, such additional set(s) of content items can be transmitted to the local device(s) and stored after the previous predicted event has occurred. In some implementations, e.g., if an additional predicted event overlaps a previous predicted event in time, the additional set(s) of content items can partially or completely replace the existing stored set of content items, e.g., if the additional sets of content items have a higher priority (or, in some implementations, an equal priority). For example, in some implementations, if the additional predicted event has an equal priority to the predicted event associated with the stored set of content items, then 50% of the highest ranking content items can be selected from each set of content items to retain in local storage. Some examples of priorities of predicted events are described with respect to FIG. 3. The method continues to block 218.

In block 218, it is checked whether any of the predicted events has occurred. In some examples, if a predicted event has particular time(s) and/or particular location(s) associated with it, then it can be checked in block 218 whether the current time is equal to any of the particular times, and/or whether one or more local devices are located in any of the particular locations. In some implementations, other conditions of the predicted events may also be checked. For example, if particular persons are determined to be in the user's presence for a predicted event (and, e.g., no time or location has been determined for the predicted event), then it can be checked whether user devices associated with those particular persons are within a threshold distance of the user devices of the user (if consent has been obtained from the user and persons checked) to determine that the predicted event has occurred. In another example, if a particular activity is determined to be performed at the predicted event (and, e.g., no time or location has been determined for the predicted event), that activity can be checked for occurrence via one or more sensors of the user device(s) if user consent has been obtained, e.g., via cameras, motion sensors, GPS sensors and map location lookup, temperature sensors, etc. For example, the occurrence of a particular event such as a birthday party may be able to be determined based on an image captured by a camera, e.g., detecting objects such as a cake, party hats, etc.

If no predicted events have occurred, the method returns to block 216 to maintain the set of content items in local storage. If one or more predicted events have occurred, the method continues to block 220, in which the set of content items may be indicated via output by the one or more local devices. For example, in some implementations, information such as messages or prompts can be output on one or more of the local devices, e.g., displayed on a display device of one or more of the local devices, indicating that the set of content items are available for access (and optionally indicating that one or more of the content items are relevant to the predicted event that has occurred). In some implementations, the indication can be output prior to the predicted event occurring, e.g., with a reminder of the upcoming predicted event. Some implementations can display interface elements such as menus, icons, etc., on the display device to allow the user to easily view the set of content items. Some implementations can indicate via display or other output on multiple local client devices which of the multiple local user devices store various portions of the content items. Some examples of various implementations are described below with respect to FIG. 6. The method continues to block 222.

In block 222, it is checked whether one or more conditions have occurred which indicate that the set of content items should be removed, or designated for removal, from local storage. For example, one condition that may cause content item removal is that the predicted event is determined to be over. In some examples, a predicted event may have a time duration associated with it, which, e.g., may have been determined when the predicted event was determined (e.g., in block 210). Block 222 can check whether that time duration has expired. In an example, a predicted event may have a time period of one hour specified for an indicated business meeting event. In additional examples, a duration of a predicted event, or the expiration of a predicted event, can be inferred based on other characteristics of the predicted event. For example, a predicted event of a birthday party on a particular day can be considered over or expired when the day of the birthday party is over.

In some implementations, the duration of the current predicted event can be determined as an estimation based on durations of previous events of the user. For example, an average time duration that the user has spent at particular locations in past, based on multiple prior visits to locations, can be determined. In some implementations, if the user has visited the current location previously (e.g., during previous predicted events), the time duration spent previously at the location can be used as the estimated duration of the current predicted event.

In some implementations, one or more operations or sensors of the local device(s) can be checked to determine if a predicted event is over, if user consent has been obtained to do so. For example, location sensors (e.g., GPS) can be checked to determine the location of the user devices. If the user device has moved from a location associated with the predicted event (e.g., a predefined area surrounding a particular location), the predicted event can be considered to be over. In further examples, a camera of one or more user devices can capture a depiction of a scene, and this scene can be checked to determine if the predicted event is still ongoing (e.g., checking if people are still nearby and talking at a party event, etc.). In still further examples, actions of the user, and content created by the user, when operating a user device can be checked. For example, if the user deselects an "airplane mode" of a device, the user's plane may have landed and a predicted event associated with the airplane flight can be considered over. If the user sends a message to another user (e.g., a person attending the event) which includes keywords such as "we had a great time" or "leaving," then the predicted event can be considered over (or soon to be over, which can cause additional checks by the system after a predetermined amount of time in some implementations). In some implementations, indications that the predicted event is not yet over based on the operations or sensors of the local device(s) can override indications of the predicted event being over based on time duration. For example, although a meeting may have been scheduled to be over after an hour, device sensors or detected device operation by the user can indicate the meeting has continued past this duration.

In some implementations, a condition that indicates removal of one or more content items from local storage can include storing other content items in that local storage. For example, the set of content items in local storage can be designated for removal if it is determined that one or more other, pending sets of content items are scheduled to be stored and available in the local storage immediately or within a short amount of time from the current time (e.g., 5 minutes, 15 minutes, 30 minutes, etc.). For example, a next predicted event may be occurring and a different set of content items that is associated with the next predicted event is stored in local storage, replacing the previously-stored set of content items.

If no conditions have occurred to cause removal of content items as checked in block 222, then the method can, e.g., return to block 220 to continue to enable access to the set of content items on the local device(s). If one or more conditions have occurred to cause removal of content items as checked in block 222, then the method continues to block 224, in which one or more content items of the stored set of content items are designated for removal. In some examples, the content items can be removed from local storage, e.g., deleted. In other examples, the content items can be designated or marked for removal, e.g., allowed to be overwritten in the storage by other data as needed.

In some implementations, a "grace period" can be assigned to the set of content items, such that the set of content items is designated to be removed or eligible to be overwritten after the grace period expires. For example, a grace period of one week after the predicted event occurs (or after the predicted event is over) can be provided, over which time the set of content items will be retained in local storage in a similar status as before the predicted event occurred.

In some implementations, after the set of content items has been designated for removal, one or more pending sets of content items determined for additional predicted events can be transmitted and stored in the local storage in place of the removed set of content items. If multiple such sets of content items are pending and there is available local storage space for only a portion of such content items, then a highest priority pending set of content items can be stored in local storage, e.g., a set of content items associated with the pending predicted event having the highest priority. For example, a set of content items that is to be used for a predicted event at which access to remote storage is predicted to not exist, can be assigned a higher priority than a set of content items to be used for a predicted event at which access to remote storage may exist (even in intermittent or limited form).

Figure 3:
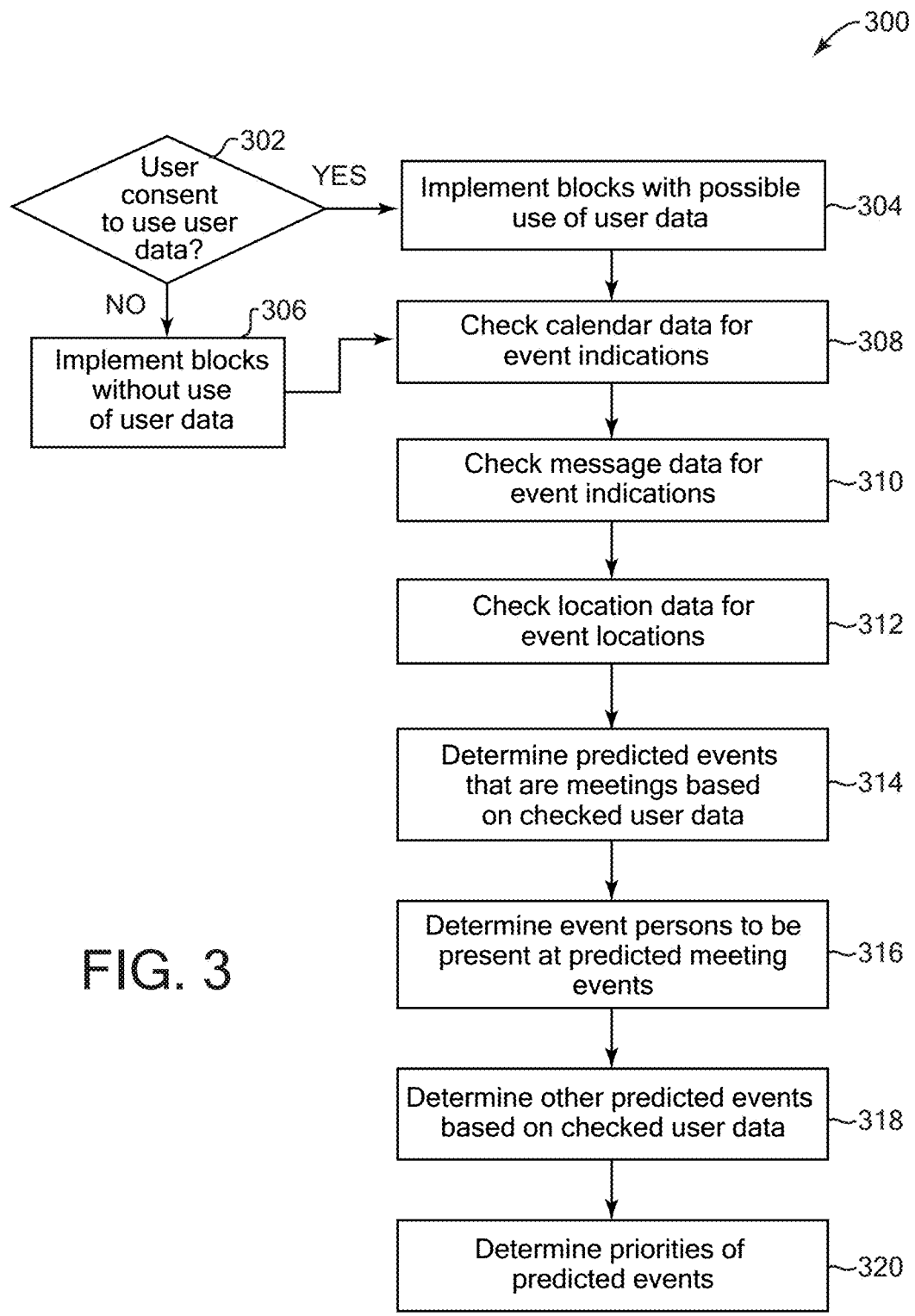
FIG. 3 is a flow diagram illustrating an example method to determine one or more predicted events based on user data, according to some implementations.

FIG. 3 is a flow diagram illustrating an example method 300 to determine one or more predicted events based on user data. For example, method 300 may be used to implement block 210 of the example method 200 of FIG. 2.

In block 302, it is checked whether user consent (e.g., user permission) has been obtained to use user data in the implementation of method 300. For example, user data can include the user data described for method 300, and can also include user preferences, user biometric information, user characteristics (identity, name, age, gender, profession, etc.), information about a user's social network and contacts, social and other types of actions and activities, content, ratings, and opinions created or submitted by a user, a user's current location, historical user data, etc. One or more blocks of the methods described herein may use such user data. If user consent has been obtained from the relevant users for which user data may be used in the method 300, then in block 304, it is determined that the blocks of the methods herein can be implemented with possible use of user data as described for those blocks, and the method continues to block 308. If user consent has not been obtained, it is determined in block 306 that blocks are to be implemented without use of user data, and the method continues to block 308. For example, in some implementations, if user consent has not been obtained, the method 300 is discontinued, or method 300 is performed without use of user data.

In block 308, calendar data is checked (e.g., programmatically analyzed) for references or other indications of upcoming events. For example, entries in the user's calendar can indicate date and time of various activities such as meetings with other people, business meetings, vacations, trips via a particular mode of transportation (e.g., car, airplane, train, etc.), special occasions (anniversaries, birthdays, holidays, visits from known persons, activities (e.g., going to a sports game, attending a performance, eating at a restaurant, etc.), occurrences of events noted by the user (broadcast of a live event or other entertainment, etc.). Calendar data can be programmatically analyzed by the system to find such indications, e.g., looking for keywords and keyphrases (e.g., "birthday," "anniversary," "meeting," etc.), and/or using machine learning for finding particular words, phrases, time periods, etc. that may indicate an upcoming event (e.g., machine learning based on created training data that is based on created calendar entries and expected determinations of events for those calendar entries).

In block 310, message data is checked (e.g., programmatically analyzed) for references or other indications of upcoming events. For example, electronic messages sent by the user can include content indicating that the user is meeting with one or more other persons. The user may have received messages indicating an upcoming event, such as a meeting with a user from whom a message is received. In various examples, the messages can be emails, text messages, instant messages, chat session messages, messages sent and received within a social networking service or other networking service, etc. The system can look for particular keywords and keyphrases, e.g., "let's meet at" or "see you at," etc. In some implementations, the system can use machine learning for finding particular words, phrases, time periods, etc. that indicate an upcoming event e.g., using training data of created messages and expected determinations of events based on those messages.

In block 312, location data is checked (e.g., programmatically analyzed) for references or other indications of upcoming events. For example, the user may use a map application on one or more user devices, and may have input a particular location as a destination for a trip or vacation. The system can determine the location as a predicted event, and/or check if the destination correlates with upcoming events indicated by other user data. In some implementations, the system can examine locations previously visited by the user at particular times or dates, and can predict an upcoming event location from such previously-visited locations. For example, if stored historical location data indicates that the user has visited a particular city on a particular holiday for each year of the last five years (e.g., above a threshold number of previous occurrences), then an upcoming event can be predicted for that same location for that same location at the corresponding time period of the current year.

In some implementations, other types of data associated with the user can also be checked. For example, social data related to the user's access to and participation in a network service, such as a social networking service, can be checked if user consent has been obtained. In some examples, social data can include user groups defined in a social networking service that can indicate which users and persons are socially connected to the user and can indicate which persons may be likely to be present at upcoming events. In some examples, user groups can indicate contexts or locations in which the user is likely to meet those users, thus indicating upcoming events. Other types of data that can be checked (if user consent has been obtained) include user activity data indicating user activities using one or more local devices, including exercise, games, etc. In some implementations, data associated with other users (e.g., users socially connected to the user), if accessible, can be checked similarly to the user data associated with the user, if user consent has been obtained from all such other users. In some implementations, user device activity such as number of views of content items by the user, number of shares of content items to other users by the user, number of edits made to a content item by a user, etc., can be stored and accessed as user data to indicate user interest in topics or content items (e.g., as in FIG. 4).

In block 314, predicted events that are meeting events are determined based on the references and other indications of upcoming events determined in blocks 308 to 312 and/or based on other user data. Meeting events can be events at which it is predicted the user will meet with one or more other persons ("event persons"), and, e.g., may wish to show one or more content items to the event persons using a local device. For example, indications from (e.g., characteristics of) calendar data, message data, location data, and/or other user data can be analyzed to determine when and where a particular upcoming meeting with other persons is to take place. In some examples, calendar data can indicate a particular time for a meeting, message data can indicate that one or more persons will be present at the meeting, and location data can indicate a likely location of the meeting. In some implementations, different types of meetings can also be determined. For example, a meeting can be characterized as a business type of meeting if found characteristics of the user data indicate that the meeting will take place in an office, with workplace colleagues, etc. Other meetings can be characterized as an entertainment type of meeting, e.g., taking place at a movie theater, restaurant, sports arena, etc. Other meetings can be characterized as an errand type of meeting, e.g., to pick up other persons at a train station, exercising at a gym, jogging on a trail, etc. Other types of meetings can also be designated for determined meeting events.

In block 316, event persons who may be present (or are likely to be present) at the predicted meeting events of block 314 are determined based on the predicted meeting events and user data. For example, in some cases the user data can directly indicate other persons with whom the user will be meeting at an upcoming event. In some examples, calendar data can specify, "meeting at 10 AM with Bob W." The system can find information related to the user Bob W., e.g. by looking at contact information on the user's devices such as a contact list. In some implementations, the system can determine which persons will likely be present at an upcoming meeting by checking previous meetings of the user, e.g., previous meetings at which the user or a device of the user was present. For example, a stored transcript or recording of a previous meeting may indicate that three persons attended that meeting. For a detected upcoming meeting at the same day of the week, the system can determine that the same three persons will be attending the upcoming meeting event and are therefore event persons. In message data, messages sent by the user to other users can indicate that the user will meet those other users. In some examples, a message that indicates a meeting (e.g., "let's meet at") may have been received from, or sent to, another particular user whom the system can determine will be present at the upcoming meeting.

In some cases, the user data may not directly specify the event persons whom the user may be meeting, and one or more event persons who may be present at an upcoming meeting can be determined by the system from other user data. For example, user data such as social data can indicate which users and persons are socially connected to the user. In some examples, socially-connected users can be included in user groups that can indicate the contexts in which the user is likely to meet those users. For example, users listed in a user group such as "work contacts" can be determined to be event persons likely to be present at one or more meetings that have been determined to be business meetings (e.g., as determined from calendar data, message data, etc.). If the upcoming meeting has been determined to be a business meeting, one or more users from such a user groups can be determined to likely be present at the upcoming meeting. Similarly, a history of shared user content data can be examined to determine with which other users the user has shared images, videos, or other content. For example, if an upcoming meeting event is determined to be an outing at a baseball game, a history of shared images can indicate that the user shared the images with particular users the most often. If it is also determined that some of the particular users are depicted in the shared images (e.g., by examining user-input tags in metadata of the images, or using image recognition techniques with the consent of the depicted users), then those depicted users can be determined to be event persons likely to be present at the upcoming event. Messages sent and received by the user that relate to similar subject matter (e.g., baseball games) can also indicate that the persons with which the messages were communicated may be present at the upcoming meeting.

In block 318, other types of predicted events of the user are determined based on the characteristics of upcoming events determined in blocks 308 to 312. For example, some predicted events may not include a meeting with another person, and can include one or more particular types of activities of the user. In some examples, the activities can include exercising, entertainment viewing, visits to particular locations, creation of various types of works (artistic, business, etc.), sightseeing, vacations, etc. Such predicted events can be determined similarly as predicted meeting events determined in block 316. For example, calendar data can indicate activities, historical location data can indicate common destination locations of the user at particular times, and message data can indicate events, e.g., data indicating the user registering for a presentation, obtaining a confirmation of a reservation, etc. Historical data can be analyzed to determine activities that the user has commonly performed in the past at particular times of the week, month, and/or year, and can be used to predict upcoming events at similar times.

In block 320, in some cases or implementations, priorities of predicted events can be determined. In some implementations, priorities can be assigned based on types of predicted events, where particular types of predicted events have a particular priority level. In some examples, a business type of predicted events can be assigned a high priority level, and non-business predicted events can be assigned a lower priority level. In some implementations, priority levels can be assigned based on the predicted availability of network access of local devices to remote storage at the predicted events. For example, a predicted event that is indicated to be at a location likely to cause local devices to have no access to remote network storage can be assigned a higher priority than a predicted event at a location having predicted normal, intermittent, or weak network storage access. For example, such a location having no access may be geographically distant from wireless access points and/or cell towers such that there is no access by the local devices to wireless networks connected to the remote network storage, or the location may be in an environment which otherwise blocks the local devices from receiving wireless signals connecting to such wireless networks. In some implementations, event locations that cause a reduction in access by one or more local devices to network storage can be assigned higher priority than event locations providing no such reduction. In some implementations, a predicted event allowing more-costly network storage access (e.g. via a cell phone data plan) can be assigned a higher priority than a predicted event allowing lower-cost access (e.g., via wireless LAN). In some implementations, priority levels can be assigned based on the persons that the user is meeting at a predicted event. Some implementations allow a user to specify the priorities for types of events, e.g., in stored user preferences or user input.

Some implementations can analyze historical user data to determine the priority of an event. For example, the frequency or duration of previous similar events can be determined, where, e.g., predicted events having a type that is more frequently occurring for the user can be assigned a higher priority (or alternatively a lower priority) and predicted events having a type that has a greater average duration can be assigned a higher priority (or alternatively a lower priority). In some implementations, priorities can be assigned to predicted events if multiple predicted events have been determined to occur at least partially simultaneously, e.g., having at least partially overlapping durations. The priority levels can be used to determine which content items to store in local storage of user devices (e.g., store the content items associated with the event having the higher priority). Some implementations can assign priority levels to individual content items, e.g., based on the types of content items. For example, such priority levels can be similar to ranking content items as described for FIG. 4.

In some implementations, predicted events can be determined that are not based on user data. For example, the predicted events can be public events determined to be of high current popularity based on mentions of the public events in publications or other public data sources, such as news events or announcements, political speeches, sports games, entertainment events, etc. Such predicted events can be determined to have a particular time when the events are to occur, and/or locations if the events are localized to a particular geographic location (e.g., a sports stadium, public venue, etc.).

Figure 4:
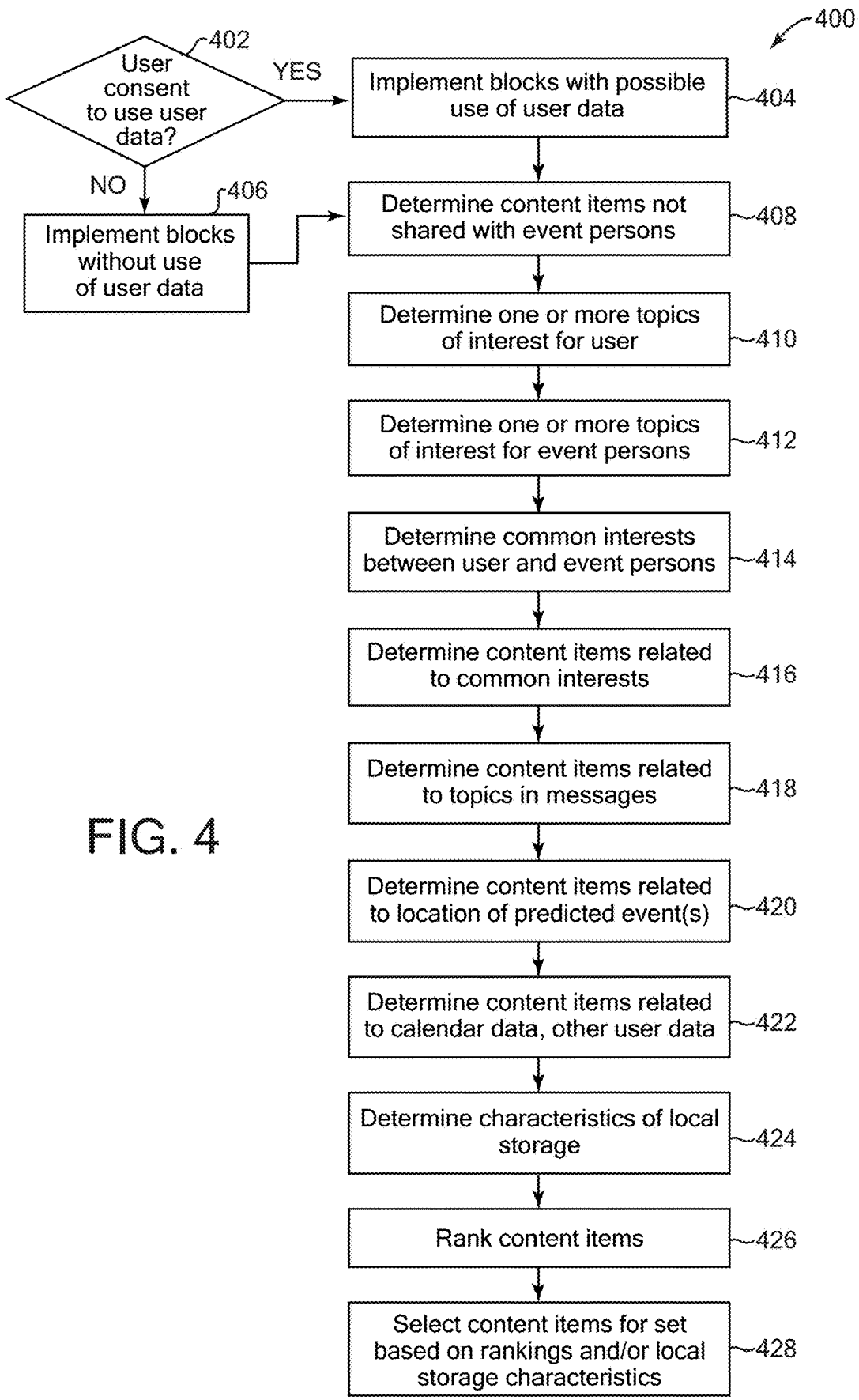
FIG. 4 is a flow diagram illustrating an example method to determine one or more content items for one or more predicted events, according to some implementations.

FIG. 4 is a flow diagram illustrating an example method 400 to determine one or more content items for one or more predicted events. For example, method 400 may be used to implement block 212 of the example method 200 of FIG. 2.

Content items can be or include any of various types of content data. For example, content items can include images (of any type, e.g., rectangular, panoramic, spherical, cylindrical, montage of multiple images, animated, cinemagraph, etc.), videos, audio clips of audio data, documents (e.g., including text and/or graphics), text data (e.g., electronic messages, schedules, lists, etc.), images, web pages, games (e.g., graphical video games), applications or other programs, haptic data to control haptic output via actuators, and/or other types of content. In some examples, a content item that is accessible to multiple users over communication networks may be converted to a content item having no such shared access, to be transmitted and stored on local devices as described herein.

In block 402, it is checked whether user consent (e.g., user permission) has been obtained to use user data in the implementation of method 400. For example, user data can include the user data described above. One or more blocks of the methods described herein may use such user data. If user consent has been obtained from the relevant users for which user data may be used in the method 400, then in block 404, it is determined that the blocks of the methods herein can be implemented with possible use of user data as described for those blocks, and the method continues to block 408. If user consent has not been obtained, it is determined in block 406 that blocks are to be implemented without use of user data, and the method continues to block 408. For example, if user consent has not been obtained, publicly-available content items (e.g., widely-published content from institutions, websites, catalogs, or other information sources) can be obtained instead of user-created content items. In some implementations, if user consent has not been obtained, the method 400 is discontinued.

In block 408, one or more content items are determined which have not been shared with the event persons determined to likely be present at a predicted event. In some implementations, the content items checked for this block can be content items that are accessible to the user. For example, such content items can include content items associated with the user, e.g., stored in remote storage relative to local device(s) carried by the user and accessible to the user, e.g., in one or more server accounts of the user. In some implementations, the checked content items can include local content items stored in local storage of the user devices. Some implementations can check content items associated with or accessible by one or more event persons, or one or more other persons, if the user has permission and access to such content items. Publicly available and accessible content items can also be checked, e.g., maps or portions of maps, images of public areas, monuments and points of interest, and other publicly-accessible content items which are permitted to be downloaded to and displayed by user devices.

A shared content item can be a content item that has been previously communicated to one or more persons, e.g., via a communication network, where the shared content item is accessible to the one or more persons via a device. If the user has shared a content item previously with an event person, there may be less desire by the event person to view that content item again at the predicted event, such that content items that have been shared may be ignored or reduced in priority for selection. The content items that have not previously been shared can be considered determined content items for potential inclusion in the set of content items sent to the local device(s). In some implementations, the one or more content items that have not been previously shared can be weighted or scored more favorably for selection (e.g., scored higher) than content items that have been shared. The method continues to block 410.

In block 410, one or more topics of interest are determined for the user. For example, these topics can be determined based on the user data obtained in block 208 of FIG. 2, if user consent has been obtained. In some implementations, topics of interest can be based on content that the user has viewed, shared, or otherwise engaged with frequently, e.g., images and video the user has viewed, documents the user has displayed and scrolled through, audio the user has selected to be output, etc. The topics of interest can be determined from detected image content features visually depicted in images and video (e.g., faces, objects, animals, landscape features, etc.), titles of content items, authors of content items, metadata tags, etc. Topics of interest can be determined from images and other user content items shared by the user, and/or from electronic messages sent from or received by the user. For example, topics that appear frequently (e.g., over a threshold number of times) in different messages or shared content to or from the user can be considered topics of interest to the user. Topics that appear with terms indicating interest ("like," "love," etc.) can be considered topics of interest. Some topics can be determined as geographic locations or times/dates of interest to the user, e.g., based on frequency of user visits to locations, references to a time or date in message or content, etc. The method continues to block 412.

In block 412, one or more topics of interest are determined for event person(s) who are predicted to be present at the predicted event. For example, these topics can be determined based on the user data obtained in block 208 of FIG. 2, if user consent has been obtained. In some examples, social data of the user from a network service can be checked. In some implementations, content items that the user has previously shared may have user content input (comments, ratings, views, and edits from event persons, sharing of the content items by event persons, etc.), and interests of these event persons can be determined based on their user content input. For example, low ratings given by an event person for an image depicting a particular image feature can indicate the person has low interest in that image, and high ratings for a different image can indicate a higher interest in the subject matter of a different image. A larger number of views or positive comments associated with a topic can indicate higher interest than fewer views or positive comments. The method continues to block 414.

In block 414, one or more common topics of interest (e.g., common interests or intersections of interests) between the user and the event person(s) estimated to be present at the predicted event. For example, it is determined which of the user's topics of interest (e.g., determined in block 410) are the same or similar as the topics of interest of the event person(s) (e.g., determined in block 412). In some examples, the determined topics of interest can be compared between the user and the event person(s), and topics of interest that are the same are considered common interests. Topics of interests that are similar can also be determined as common interests. For example, some implementations can compare categories of topics. For example, if a user's topic of interest is in a same category as an event person's topics of interest (or vice-versa), a common interest is determined. Some implementations can determine categories of topics and other related concepts by consulting stored relationships between concepts as provided in one or more accessible knowledge bases (e.g., knowledge graphs), databases, etc. In some examples, a "terrier" topic can be considered to be in the larger category of "dog" or "pet" as indicated in an accessed knowledge base or other stored hierarchical categorization, and a "beagle" topic can also be found to be in the category of "dog" or "pet,", such that topics of "terrier" and "beagle" can be considered to be similar and indicate a common interest. The method continues to block 416.

In block 416, one or more content items are determined which are related to the common interests determined in block 414. Similarly as in block 408, the content items that are searched, e.g., checked as to being related to the common interests, can be content items accessible by the user. In some implementations, the content items checked for being related to common interests in block 416 can be the content items of block 408 which were determined to have not been shared with event persons.

The content items can be checked if they have one or more characteristics related to a common interest. For example, the content (e.g., subject matter) of the content items can be checked, including checking the visual content depicted in images (e.g., as described by tags, recognized image features using one or more image detection or recognition techniques, etc.), text of documents, detected audio features in audio data (e.g., recognition of speech or audio sound effects using speech recognition or audio recognition techniques), metadata of content items, etc. For example, if a common interest has been determined to be "baseball," then content items having content related to baseball or a baseball game are determined. For example, images depicting scenes from a baseball game (e.g., having tags or detected image features having the term "baseball," baseball team names, stadium names, audio recorded from a baseball announcer that refers to teams, etc.) can be determined as content items related to a common interest. Other characteristics of content items can be determined to be related to a common interest. For example, location data (e.g., metadata of a content item, or location data associated with the user) can indicate that an image was captured at a baseball stadium, and so is considered related to baseball. Timestamp data for a content item can indicate that the content item was captured or created at a particular time that is relevant to a common interest, e.g., on a birthday, anniversary, day of a baseball game, etc. In additional examples, if a common interest has been determined to be a "Budget Planning Meeting," then content items having characteristics including a term "budget" or a creation date during a previous budget planning meeting can be determined as related to that common interest. In some implementations, such determined content items are considered determined content items eligible for inclusion in the set of content items sent to the local device(s). The method continues to block 418.

In block 418, one or more content items can be determined which are related to topics in messages sent or received by the user, if such content items are present in the accessible content items. The content items can be determined from accessible content items similarly as described above, and/or determined from a subset of content items such as unshared content items determined in block 408. For example, text messages, emails, chat messages, and other messages sent and received by the user can be checked for topics, and content items having one or more characteristics (e.g., content/subject matter, location, creation timestamp, etc.) related to such topics can be determined. One or more of the determined content items can be related to the predicted event, e.g., have one or more characteristics (e.g., content, location or time of creation) related to topics found in messages that were used to determine the predicted event as described above, or related to one or more event persons, etc. In some implementations, one or more of the determined content items can be unrelated to the predicted event.

In some examples, messages that are sent to an event person or which include a reference to an event person can be programmatically analyzed to determine topics that may be relevant to or associated with the receiving or referred event person. In some implementations, messages sent to or received from other persons besides event persons are also programmatically analyzed. In some implementations, messages that were sent to and received from one or more event persons are checked and topics obtained from such messages can be assigned higher ranking scores (e.g., weights) than messages sent to other persons or messages posted or sent for viewing by multiple persons. Some topics in messages can be determined to be of higher interest to the user, as described above.

The system can check for content items which are related to detected topics, similarly as described above in block 416. Content items related to a message topic of greater interest to the user and/or one or more event persons (e.g., determined as a topic of interest as described above) can be assigned higher ranking scores or weights. In some cases, such messages can also be checked to determine predicted events (e.g., as described for FIG. 3) and/or common interests (e.g., as described for blocks 410-416). In some examples, a message from the user to another person with content such as "I liked that new album from XYZ," can be detected and cause the system to check for and find content items related to the referred music album, e.g., audio tracks of songs from the album, album jacket notes, text lyrics to songs, images depicting members of this band in performance or in interviews, descriptions of band members, schedules of where the band will be playing, etc. Such determined content items are eligible for inclusion in the set of content items to be sent to the local device(s). The method continues to block 420.

In block 420, one or more content items can be determined which are related to a geographic location of the predicted event, if such content items are present in the accessible content items. The content items can be determined from accessible content items similarly as described above, and/or determined from a subset of content items such as unshared content items determined in block 408. The content items can have one or more characteristics related to location of the predicted event. For example, the geographical location of a predicted event may have one or more environmental features (e.g., terrain, buildings, roads, sights of interest, etc.), and content items including content depicting or describing the environmental features can be searched in the available content items (e.g., such features detected in an image using image recognition techniques). If the location of the predicted event has one or more associated names (e.g., names of monuments, buildings, parks, streets, businesses, neighborhood names, etc.), then those names can be searched in the accessible content items. Content items that were previously captured or created by the user at or near the location of a predicted event (e.g., within a threshold distance, such as 200 feet, 2 miles, etc.) can be searched in the accessible content items, such as images captured by the user near the location, audio recordings recorded by the user near the location, documents created near the location, etc. Content items related to a location that is known to be of greater interest to the user and/or one or more event persons (e.g., determined as a topic of interest as described above) can be assigned higher ranking score or weight. In some implementations, if user consent has been obtained, content items can be determined which have been commonly previously captured or accessed at the location of the predicted event by many users (e.g., as determined by data describing aggregate capture and access locations of content items of many users, not individual users). For example, publicly-available maps, documents, or images can be determined to have been commonly accessed at the location, e.g., captured or accessed by a threshold percentage of general users. In some implementations, such determined content items are eligible for inclusion in the set of content items to be sent to the local device(s). The method continues to block 422.

In block 422, one or more content items are determined which are related to calendar data associated with the predicted event, and/or other data related to the predicted event, if such content items are present in the accessible content items. The content items can be determined from accessible content items similarly as described above, and/or determined from a subset of content items such as unshared content items determined in block 408. For example, a calendar activity or event may specify, "Outing with John's family," and a particular time for the calendar activity. Content items can be searched for which have one or more characteristics related to the time of day of the calendar activity (e.g., images of sunsets), time of year (e.g., if it is a particular holiday, images and videos depicting family members can be selected), previous dinners at which the user was present (e.g., images or videos depicting the user or event persons at dinner), and/or previous content items depicting or describing one or more of the event persons (in John's family), food items liked by the user, etc.

In further examples, content items can be determined that were captured or created on the same day or date in a previous week or month, or the same month in a previous year, as a calendar activity. Content items related to a time or date of greater interest to the user or one or more event persons (e.g., determined as a topic of interest as described above) can be determined, and can be assigned higher weight or ranking score. Other accessible data related to the predicted event can also be used to determine content items. For example, historical data indicating similar activities performed by the user in the past, titles of content viewed by the user recently, or other data can be used to extract topics which can be searched for in accessible content items to find content items having one or more related characteristics. In some implementations, such determined content items are eligible for inclusion in the set of content items to be sent to the local device(s).

In some implementations, content items can be determined without use, or with more restricted use, of user data. For example, public content items (e.g., publicly-accessible and—usable content items) can be retrieved, e.g., from websites, publications, network services, or other data sources on the internet, based on finding same or similar characteristics associated with the predicted event similarly as described above. In some implementations, the public content items can be determined based not on user data or a predicted event (e.g., a predicted event may not have been determined), and based on aggregate information about popularity of certain content items (e.g., related to trending topics on network services), or general popularity of current news, upcoming well-known events (e.g., popular sports game, concert, etc.), and other well-known information. For example, popularity can be estimated based on number of publications describing a news item or event, published popularity lists or top-ten lists, etc.

In some implementations, such public content items can be determined based on a determined location, e.g., a location of the predicted event, or if no predicted event location has been determined, a current location of a user device or a planned location of a user (e.g., in a travel itinerary), if user consent has been obtained. In some examples, a determined location of a concert hall can initiate retrieval of public content items that are music clips, music metadata, magazine articles about music, etc. A company office location can initiate retrieval of public content items relating to the company, news items about the company, etc. A sports venue can initiate retrieval of public content items including sports team player profiles for a sport played at the venue, team information, etc. In some examples, such sport-related content items can be determined based on determining that the sports venue has a current popularity at a particular time (e.g., a current time or upcoming time within a predefined time period of the current time). A type of content item can be determined and retrieved if its type has been pre-associated with a location, e.g., book content items for a location associated with reading, video content items for venues associated with video watching, etc. The method continues to block 424.

In block 424, one or more characteristics to local storage are determined. The characteristics can include storage constraints, number of local devices, device capabilities, etc. For example, if the local user device(s) have particular amounts of storage space available to store received content items, the amount of available storage space is determined. In some implementations, storage space on multiple local user devices can be considered, e.g., combined into a total available storage. Other constraints can also be checked, such as a maximum number of content items that can be stored by the local user device(s), display constraints of processors and/or display devices related to content items (e.g., resolution, 3D display capability, speakers for audio output, etc.), availability of particular network connections (e.g., wireless network, cellular data network, etc.). In some implementations, a local device may have a particular amount of available storage, but application, device, or user configurations have allowed only a portion of this available storage to be used for content items. In some implementations, the determination of storage constraints and other characteristics in block 424 can be a current estimate, and different storage constraints may be determined before transmission of the content items to the local device, e.g., if different local devices are selected for storage as described below with respect to FIG. 5. For example, in some implementations the estimates of block 424 can include an estimate of maximum storage capacity of currently-detected local device(s). The method continues to block 426.

In block 426, the determined content items from the previous blocks are ranked. The ranking can be performed based on a variety of criteria. For example, individual scores or weights from various criteria can be assigned to each determined content item and the individual scores combined to achieve a total ranking score for each determined content item.

Some content items can be assigned a ranking based on their determined interest to the user and/or to one or more event persons as described above. Additionally or alternatively, the ranking scores of content items can be assigned or adjusted based on a variety of other factors. In some examples, determined content items can be ranked based on their recency (e.g., the more recent the content item was created or captured, the stronger the ranking score, e.g., the higher the ranking score), on their content type (e.g., images and videos can be assigned higher scores than audio data segments or text documents), on their content (e.g., faces depicted in images can be ranked higher than other objects), on their required storage space (e.g., content items requiring less storage space can be ranked higher), on their length of presentation (e.g., shorter videos or audio segments can be ranked higher), on the person who created or sent the content (e.g., content items captured or created by the user can be ranked higher than content items received from other persons), etc.

In some implementations, determined content items can be assigned a ranking score based on one or more characteristics of the predicted event. For example, a ranking score can be based on the degree of similarity or match (e.g., how close a match) between the content item and a topic or common interest of event persons likely to be at the predicted event as described above (e.g., the closer the match, the higher the ranking). A ranking score can be based on the time duration of the predicted event. For example, if the predicted event is determined to be above a threshold duration, longer-duration content items (e.g., videos or audio) can be ranked higher than if the predicted event is below the threshold duration. Content items that depict or describe subject matter present at the location of the predicted event can be ranked higher than other content items. For example, if the predicted event is at a baseball game, content items depicting previous baseball games at which the user was present can be ranked higher.

In some implementations, determined content items that have not been shared with and/or viewed by event persons can be assigned a ranking score higher than content items that have previously been shared with and/or viewed by those persons. Some implementations can designate some instances of characteristics to be assigned the highest ranking (e.g., images that visually depict the user and all the event persons likely to be present at the predicted event, etc.) and/or the lowest ranking (e.g., images that visually depict particular designated types or subject matter of content, content items have a creation date more than a threshold time period before the current time, etc.). Some implementations can read stored user preferences that were previously input by the user and indicate which types of characteristics are to be scored or weighted highest in the ranking, which types of characteristics are to be scored lowest, etc.

Some implementations can emphasize diversity of content items (e.g., diversity of type of content items (image, video, audio, etc.), diversity of types of depicted/described subject matter (e.g., faces, objects, landscapes, etc.), diversity of creation date (e.g., a minimum time period between content items), etc.). For example, the system can reduce ranking scores of content items that are the same or similar to previously-selected content items in one or more particular characteristics. In some implementation, the diversity characteristics and criteria can be specified by user preferences or user input.

Some implementations can assign ranking scores for content items based on the storage space they need to be stored. For example, smaller-sized content items can be assigned higher ranking scores and larger-sized content items can be assigned lower ranking scores, e.g., if a larger number of items is prioritized over the storage size of items (e.g., which can be indicated in stored user preferences in some implementations). In some implementations, the characteristics of the local storage determined in block 424 can inform or influence the rankings. For example, if a relatively low amount of local storage is available (e.g., below a predefined threshold amount), then the smaller-sized content items can be assigned a higher ranking score than larger-sized content items. The characteristics of available local devices can influence the ranking. For example, if the only available local storage is on local devices having a small or low-resolution display screen, then high-resolution images and video can be assigned a lower ranking score than lower-resolution images and videos.

In some implementations, the ranking scores of the content items can be determined without considering the characteristics of local storage, and the ranking scores can be adjusted based on the local storage characteristics and/or based on user preferences. For example, if one or more highest ranking content items are too large to fit in the available local storage, these content items can be reduced in ranking score and the next highest ranking content items that will fit in the available local storage space are adjusted higher in ranking score. In another example, if stored user preferences have indicated that at least half of the content items sent to the local devices are to be a certain type (e.g. images), then various ranking scores can be adjusted until the number of content items of that certain type are ranked high enough to allow the content items to fit in the available local storage space. The method continues to block 428.

In block 428, content items are selected for the set of content items that are to be provided for storage on local user device(s) determined in block 424. In some implementations, the highest ranking content items are selected for the set, e.g., the content items having the highest ranking scores. In implementations herein, a high ranking score indicates the content items is more suitable for selection; other implementations can provide other scoring schemes (e.g., lower score indicating more suitable for selection, etc.). In some implementations, if the local storage characteristics indicate that a particular amount of storage is available for content items, then a number of the highest ranking content items are selected which can be stored in that available storage space. In some implementations, additional checks on local device storage constraints can be performed before or during transmission of the content items to the local user device(s), e.g., as described with respect to FIG. 5.

The blocks of method 400 can be performed to determine content items for a particular predicted event, as described above. In some implementations, another predicted event can be selected and the method 400 can be performed to determine a set of content items for that predicted event. Thus, a respective set of content items can be determined for each predicted event. Some content items may appear in multiple sets for different predicted events.

In various implementations, the order of the blocks in method 400 can be different. For example, some implementations can first determine and rank a set of content items based on content items characteristics and not based on local storage characteristics, then can adjust that ranking and select the set of content items based on local storage characteristics and/or user preferences, e.g., if such local storage characteristics are determined later.

Figure 5:
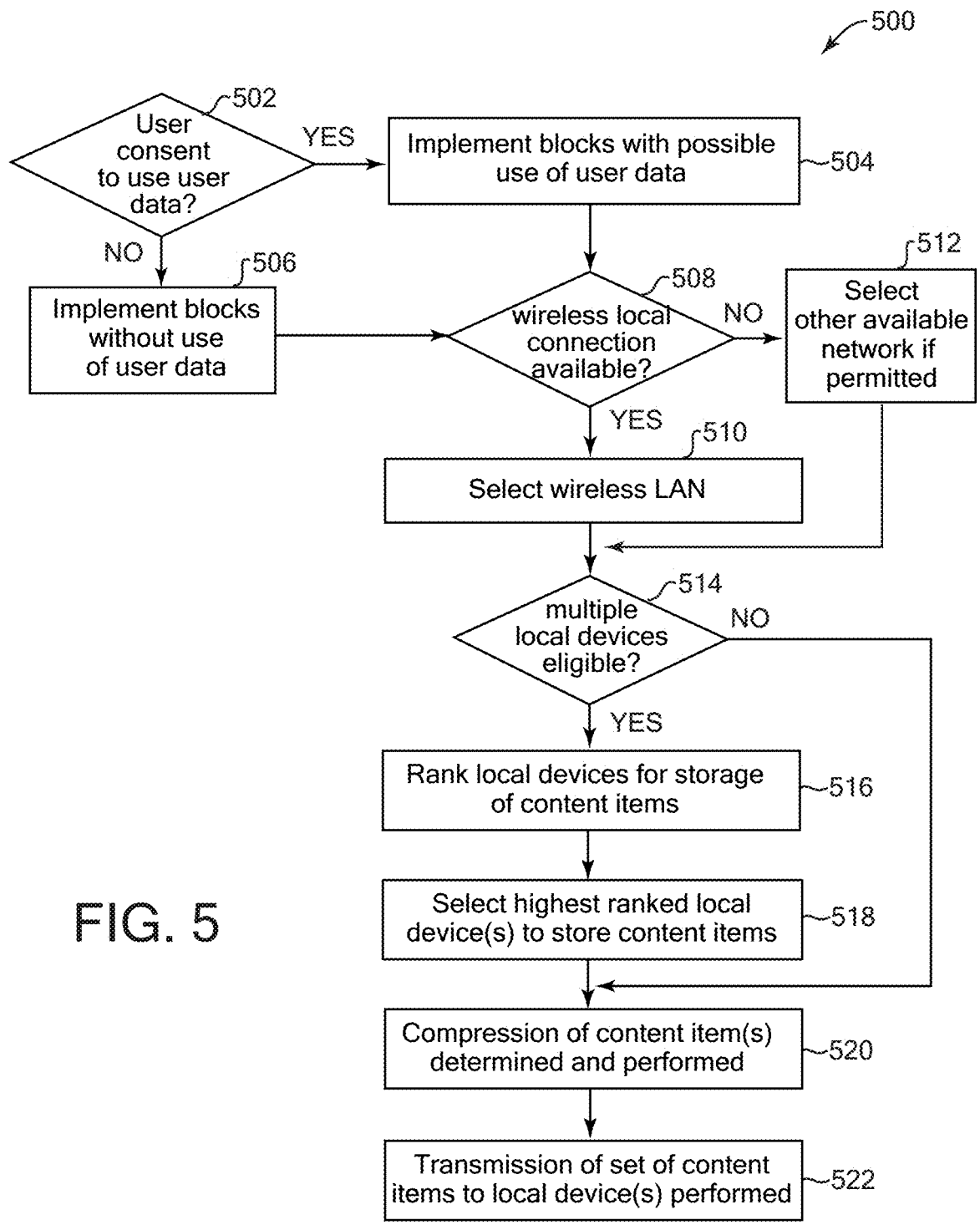
FIG. 5 is a flow diagram illustrating an example method to transmit a set of content items over a communication network from network storage to one or more local devices, according to some implementations.

FIG. 5 is a flow diagram illustrating an example method 500 to transmit a set of content items over a communication network from network storage to one or more local devices. For example, method 500 may be used to implement block 214 of the example method 200 of FIG. 2.

In block 502, it is checked whether user consent (e.g., user permission) has been obtained to use user data in the implementation of method 500. For example, user data can include the user data described above. One or more blocks of the methods described herein may use such user data. If user consent has been obtained from the relevant users for which user data may be used in the method 500, then in block 504, it is determined that the blocks of the methods herein can be implemented with possible use of user data as described for those blocks, and the method continues to block 508. If user consent has not been obtained, it is determined in block 506 that blocks are to be implemented without use of user data, and the method continues to block 508. For example, if user consent has not been obtained, multiple local devices can be ranked without use of user data. In some implementations, if user consent has not been obtained, the method 500 is discontinued.

In block 508, it is checked whether a wireless local network connection is available for transmitting the set of content items to the (receiving) local device(s). In some examples, a wireless local network connection can be a wireless local area network (LAN) connection that, for example, uses an IEEE 802.11 standard or other similar standard, where the local device(s) can connect to server devices and/or other local devices via the wireless LAN connection. In further examples, a wireless local network connection can be a peer-to-peer wireless connection (e.g., Bluetooth® or other type of network connection), where the local device(s) to receive the content items can connect to and receive the content items from one or more other local devices via the peer-to-peer connection (e.g., where the other local device may have previously received the content items from network storage, or may store the content items in a higher storage capacity than the receiving local device(s)). For example, some implementations of method 500 can check for such a network connection to allow faster and/or less costly transfer of data than other types of network connections, e.g., such as a data connection of a cellular service.

If a wireless local network connection is available, the method continues to block 510, in which the wireless local network is selected, and the method continues to block 514, described below. If a wireless local connection is not available, then the method continues to block 512, in which a different network connection to the local user device(s) is selected, if such a network is available and if use of such a network is permitted. For example, a wireless cellular data connection can be accessed, or a wired network connection, e.g., if one or more of the local user devices is connected to a wired communication network. In some implementations, a different network is used if the user has provided permission to use such a network, or the method is discontinued if no such permission has been provided. The method continues to block 514.

In block 514, it is checked whether multiple local user devices are eligible to receive content items from the remote storage that currently stores the set of content items. In some implementations, a user may have multiple mobile local devices which can each store one or more of the set of content items. For example, the user may have a mobile phone, a tablet device, a display (e.g., augmented or virtual reality) headset, and a wristwatch device which are eligible to store content items. In some implementations, to determine local device eligibility, the system performing method 500 can determine which local devices are available to the user by examining which devices the user has previously used, e.g., based on previous accesses of user accounts using the devices. For example, stored data describing previous local devices used by the user (e.g., types of devices and times/locations of such use) can be accessible as user data, if the user has consented to such access.

The system may also be able to detect whether these devices are currently available to receive and store content items. For example, in some implementations, a server implementing block 514 can send signals to the multiple local user devices to request the local devices to respond with device information indicating that the devices are connected to the network and/or are available to store content items, where a local device can be considered not available if no answering signal is received by the server. In some implementations, the server can request to receive device information indicating current states and/or characteristics of the available local user devices, such as available storage capacity, processing capability, etc. A local device receives the request and answers with the device information indicating the requested states and characteristics. In some implementations, the system may request device information from the local devices at different times, e.g., prior to and/or after the performing of method 500.

In some implementations, the system can detect local devices that are not owned or previously accessed by the user but which are determined to be likely to be present at the user's location during the predicted event. For example, business premises, public service areas, or other establishments open to the public may have one or more local devices available for persons and which are operative and available to store and display content items from public persons or members of the establishment. In some examples, one or more of the user's local devices may be able to detect the presence of such local devices at particular locations, e.g., using local networks and/or peer-to-peer network protocols (e.g., Bluetooth®). In some implementations, the presence of such local devices at particular locations can be determined using publicly-available information, e.g., websites or other sources relating to establishments at the location.

If it is determined in block 514 that multiple local devices are not eligible, then the method continues to block 520, described below. If it is determined that multiple local devices are eligible, then the method continues to block 516, in which the multiple local devices are ranked for storage of content items. For example, in some implementations, a ranking can be determined as a score. The rankings can be based on one or more of a variety of different factors.

For example, a ranking score of a local device can be based on device states and characteristics that indicate available storage capacity and processing capability of the local devices. For example, a higher ranking score can be assigned to a device having a current larger storage capacity. The current available storage capacity of the local devices may have been determined in block 512 based on device information provided by the local devices as described above. Some implementations can determine a predicted amount of availability of local storage at the time of the predicted event and determine a ranking score based on this predicted storage availability. For example, the prediction can be based on current availability of local storage and an estimate of usage of local storage by the user in the time remaining between the current time and the time of the predicted event, where the estimate of local storage usage is based on previous usage of local storage on the local device by the user over time (e.g., how local storage has been filled and freed up over time).

In another example, a characteristic of a local device that can influence ranking can be current battery power level and/or battery power storage capacity, e.g., as reported as device information to the system implementing method 500 by the local device. If a current battery level is below a predefined threshold and a predicted event is to occur in the near future (e.g., under 1 hour), then that local device can be reduced in its ranking, indicating that it is less suitable to store content items due to a possibility of running out of power during the predicted event. Similarly, a local device with a battery capacity that may not last the entire duration of a predicted event can be reduced in ranking score.

A ranking score of a local device can be based on whether the local device is likely to be present with the user at the predicted event. For example, particular types of local devices may be able to be excluded from consideration (e.g., assigned a very low ranking score). In some examples, non-mobile local devices (e.g., television, desktop computer, etc.) can be ranked with a low score if the predicted event is at a location different than the usual location of use of these devices, or a virtual reality headset can be ranked with a low score for a sightseeing event location.

A ranking score of a local device can be based on previous (historical) usage of the local devices by the user, and/or whether such previous usage is related to one or more of the predicted events or event persons. For example, the server can retrieve and check stored data indicating usage of the local devices by the user in the past, if user consent has been obtained for such retrieval. The usage data can indicate usage patterns of the user for the local devices, e.g., which local devices the user uses most frequently, which local devices the user accesses at particular locations (e.g., at home, at work, at other locations, on vacation, etc.), and/or which local devices the user has used to view content items and/or used to perform other tasks. For example, if a predicted event is determined to take place during a user's vacation, then the local device(s) previously used while the user was on vacation can be assigned a higher ranking score. If the user has previously used a local device to perform navigation or other tasks and not for viewing content items, then that device can be assigned a lower ranking score.

In some implementations, particular types of devices can be previously associated with particular types of content, e.g., which are most frequently viewed or used on that type of device. Such associations can be stored and accessed to determine ranking scores of devices. For example, a laptop device can be associated with documents, slideshow presentations, and similar types of content, and a tablet device can be associated with images, videos, and audio types of content. In some implementations, the ranking score of a local device can be based on the number of content items of the set of content items that are associated with that type of device. For example, a higher ranking score can be assigned to a mobile phone device and a lower ranking score can be assigned to a laptop computer device if a large number of the content items in the set are image or video types. In some implementations, the ranking score of a local device can be based on a percentage of content items of the set of content items having a particular type. For example, the larger the percentage of a particular type, the higher the ranking score of a device associated with that type.

The ranking scores of local devices can also be based on stored user preferences indicating which local devices the user prefers to store content items. In some implementations, the system can instruct that a prompt be displayed on one or more of the local devices to receive user input from the user, where the user input indicates which of the local devices that the user prefers to store content items.

In some implementations, an individual ranking score can be determined for each of the ranking factors evaluated (including one or more of any of the above-described factors), and the individual ranking scores for the factors can be combined (e.g., summed) into a total ranking score for each available local device. The method continues to block 518.

In block 518, particular local devices are selected to store the set of content items, and the storage distribution of the set of content items among the selected local devices is determined. In some implementations, the highest ranked local device(s) based on the rankings of block 516 are selected to store the set of content items. For example, the total ranking score is compared for the local devices and the local device(s) having the highest total ranking scores are selected. In some examples, the highest ranked devices can be determined as the one or more local user devices that are most suitable to receive and store content items based on the ranking scores. In implementations herein, a high ranking score indicates the device is more suitable for selection; other implementations can provide other scoring schemes (e.g., lower score indicating more suitable for selection, etc.).

In some implementations, multiple local devices can be selected and the storage distribution of content items in local storage of these local devices is determined. For example, the local devices having a total ranking score that is above a predetermined ranking threshold can be selected for content item storage. In some implementations, the system can determine the available storage capacity of the highest ranking local device. If the highest ranking device does not have enough storage capacity to store all of the content items in the set of content items, then one or more additional local devices can be selected. In some examples, if the highest ranking local device is a mobile phone that is determined to have storage capacity that will not hold all of the set of content items, then the next highest ranking device (e.g., a tablet device) can also be selected to store at least some of the content items.

In some implementations, if the highest ranking local device cannot store all of the content items in the set of content items, the next highest ranking device can be selected to store all of the content items, e.g., so that the entire set of content items is stored on a single device. In some implementations, subsets of the set of content items can be stored on multiple different devices based on various criteria. For example, some implementations can divide the content items for storage on different local devices based on the type of content items. In some examples, images can be stored on one of the local devices, and videos and audio clips can be stored on a different local device. In some implementations, content items that are better suited for display or output on one type of device can be designated for local storage on that type of device. For example, a higher-resolution image may present better detail on a device having a larger screen, and so such an image can be designated to be sent to a larger-screen local device (e.g., a tablet device) and not a smaller-screen local device (e.g., a mobile phone). Content items having an audio component (e.g., video or audio clips) can be assigned to local devices having speakers. Some local devices may not be currently available to store content items even if there is sufficient storage capacity, e.g., the processing capacity of a local device may be occupied by performing one or more tasks and may not be available to store content items. In some implementations, such local devices can be removed from consideration to store content items.

Various implementations can divide content items for storage on different local devices based on one or more other criteria, e.g., the subject matter depicted or described in the content items (e.g., all persons, or particular persons, stored on one device, or all landscapes stored on one device), based on time of capture or creation (e.g., all recent content items selected for storage on the highest ranking device until available storage capacity is filled, and the remaining older content items selected for storage on a different local device), based on storage size (e.g., all content items that are less than, for example, 1 megabyte in storage size are designated for one device, and larger content items are designated for a different local device), based on one or more of the predicted events associated with each local device (e.g., all content items related to a business event designated for one device, all content items related to a dinner event designated for a different device, all content items related to a predicted event at a particular location designated for a particular device), based on a ranking of the content items, such as the ranking of block 426 of FIG. 4 (e.g., highest ranked content items designated for one device, remaining content items designated for a different device), based on user preferences, etc. Some implementations can combine two or more of these criteria for determining which local devices are selected to store which particular content items of the set of content items.

In some implementations, particular content items can be designated for storage on multiple local devices, if such storage and devices are available. For example, particular images and videos can be designated for storage on both a mobile phone and a tablet device of the user, e.g., if there is sufficient local storage on these devices.

In some implementations, one or more local devices associated with one or more other users, who are different than the user associated with the content items, can be selected to receive content items for local storage. In some examples, some content items can be shared or co-owned by multiple users. For example, a shared album may be stored on network storage, which can store images, videos, and other content items that can be accessed by any of the users associated with the shared album. In some cases or implementations, if it is determined that multiple users associated with content items are to appear at the predicted event (e.g., alongside additional users not associated with the content items), then any of these users' local devices can be used to store one or more of the content items. For example, if two users are associated with a shared album stored on a server, and both users have limited local storage capacity on their local devices that will not store the entire set of content items, then a first portion of the set of content items can be designated to be stored on a first selected local device of the first user, and a second portion of the set of content items can be designated to be stored on a second selected local device of the second user.

Some implementations can determine which of the shared content items are to be stored on a particular user's local devices, based on any of a variety of factors. For example, content items that were owned, captured, or created by one of the different users can be designated to be stored on that user's local device(s). Content items that depict or describe a particular user can be stored on the depicted user's local device, or alternatively, on a local device of a user who is not depicted or described. Content items that depict or describe subject matter that is determined to be more strongly associated with (or of interest to) one of the users can be designated for that user's local device. For example, if it is determined that one of the users mentioned the term "baseball" in a threshold percentage more messages than the other users, content items related to baseball can be designated to be stored on that user's local device(s).

In block 520, compression of one or more content items in the set of content items can be determined and performed, in some implementations. For example, one or more constraints can be checked to determine if one or more content items should be compressed. In some examples, the current total available storage capacity across all available local devices is checked, and if it is less than the storage size of the set of content items, and/or if the storage of the content items would allow less than a predefined amount of free storage to be available on the local devices, then one or more content items can be compressed to reduce their used storage space. In some implementations, the current amount of availability of storage, processing capacity, or other characteristics of local device(s) can be determined based on device information and/or network information reported and transmitted by the local devices, e.g., to a server, as described above. In some implementations, the local storage constraints can include transmission constraints on sending the content items to the local device(s). For example, a current bandwidth of the transmission channel from the system performing method 500 to the local device can be determined, and if this bandwidth is below a predefined threshold, then a constraint is present one or more content items can be compressed to reduce the amount of data to be transmitted. Some implementations can determine a predicted amount of availability of local storage at the time of the predicted event as a constraint, which can be determined as described above.

If sufficient constraints are present, one or more content items can be compressed. For example, if a determined constraint is that the total available storage capacity for the local device(s) is less than storage space needed for the set of content items, then one or more of the content items can be compressed using one or more compression algorithms to reduce the storage space needed to store those content items (e.g., using lossy or lossless compression algorithms). For example, a number of lowest ranked content items (e.g., based on rankings determined in block 426 of FIG. 4) can be compressed to reduce the storage size of the set of content items to the available storage capacity of the local devices. Compression settings can be determined by user preferences or user input, in some cases.

In some implementations, the number of content items in the set of content items can be reduced, e.g., by removing one or more content items in the set such that the remaining content items in the set fit within the storage capacity of the local device(s). For example, a number of the lowest ranking content items (e.g., based on rankings determined in block 426 of FIG. 4) can be removed from the set of content items such that the set of content items fits within the storage capacity of the local device(s).

In some implementations, content items can be compressed (and/or removed) from the set based on one or more other or additional criteria. For example, content items can be compressed (and/or removed) based on the type of content item (e.g., videos and/or audio clips can be compressed before images), based on subject matter depicted or described in the content items (e.g., landscape scenes compressed before scenes showing people), based on the capture or creation date of the content items (e.g., older content items are compressed or removed first), etc. In some implementations, stored user preferences or current user input can indicate which content items to compress and/or remove. For example, the user preferences may indicate that having a greater number of content items is more important than the quality of those content items, in which case some or all of the content items can be compressed in order to fit more content items in storage. In some implementations, compression can also or alternatively be considered when selecting the set of content items in method 400 of FIG. 4 (e.g., block 428), and compression can be designated for content items that are determined to be compressed by block 520.

In some implementations or cases, if multiple local devices are available, compression or removal of content items can cause the method to return to block 518 to select one or more different local devices to store the set of content items. In some examples, compression and/or removal of some content items may allow the set of content items to fit in the local storage of a single local device, such that a second local device can be removed from selection and is not sent content items. The method continues to block 522.

In block 522, transmission of the set of content items from the network storage (or from the system performing method 500) to the storage of the selected local device(s) is performed. The transmitted set of content items can be a copy of the set of content items stored on the network storage. For example, in some implementations, the network storage can be provided on a server, and the set of content items is transmitted over one or more communication networks to be received by the local device(s) and stored in the local storage of the local device(s). In some implementations, if multiple local devices are receiving content items, appropriate content items of the set can be directly transmitted to each local device that has been selected to store those content items. In some implementations, a subset of the selected local devices (e.g., one local device) can receive the set of content items and can transfer appropriate content items to one or more other local devices for storage (where the receiving local device removes the transferred content items from its own storage). For example, a first local device can receive the set of content items and forward appropriate content items of the received set to one or more nearby local devices using a local peer-to-peer network connection (e.g., Bluetooth®, Wi-Fi Direct®, etc.).

In some implementations, if one or more of the selected local device(s) is not currently available to receive content items, then the system can (e.g., periodically) check for availability of these devices in the time period between the current time and the time of the predicted event. If the previously-unavailable device(s) become available, a transmission of the associated content items to these devices can then be performed. In some implementations, if one or more unavailable local devices do not become available to receive associated content items before a threshold time period before the predicted event, the system can send a notification to one or more available local devices of the user to request that the user make these unavailable devices available (e.g., power on the local devices, enable network connection, etc.).

In some implementations, one or more local devices can provide updates to the system(s) performing methods 300-500 describing one or more characteristics of the local devices related to the storage of the set of content items. For example, such characteristics can include a change in available local storage. In some implementations, if a greater amount of local storage on a local device becomes available for content items in a time period before the time of the predicted event (e.g., greater than the local storage amount previously determined and used in methods 400-500), that local device can inform the system(s) performing the above methods of this change. In some implementations, the system can add more content items to the stored set of content items due to the greater amount of local storage. For example, the next highest ranked content items in the ranking of content items can be added to the set of content items in method 400, one or more suitable highest ranked local devices can be determined in method 500 to store the added content items, and the added content items can be transmitted to the determined local device(s) using the method 500. In some cases, some or all portions of methods 400 and 500 can be performed again, e.g., to re-rank content items and/or local device(s) based on the change in local storage and or other change in characteristics of the local devices.

Similarly, if less local storage on a local device becomes available for content items in a time period before the time of the predicted event, that local device can inform the system(s) performing the above methods of this change. For example the local device can indicate the amount of local storage that is needed to be freed (e.g., for other functions of the local device). In some implementations, the system can determine which content items to remove from the stored set of content items due to the reduced amount of local storage. For example, the lowest ranked content item(s) stored on the updated local device can be designated for removal based on the ranking of method 400, e.g., a number of content items sufficient to free up the indicated amount of local storage. The designations/identifications of the content items can be sent to the requesting local device, and the local device can remove the designated content items from its local storage. In some implementations, the local device may have access to the ranking of the content items (e.g., locally stored), and can determine which lowest-ranking content items to remove from its local storage. In some cases, some or all portions of methods 400 and 500 can be performed again, e.g., to re-rank content items and/or local device(s) based on the change in local storage and or other change in characteristics of the local devices.

Figure 6:
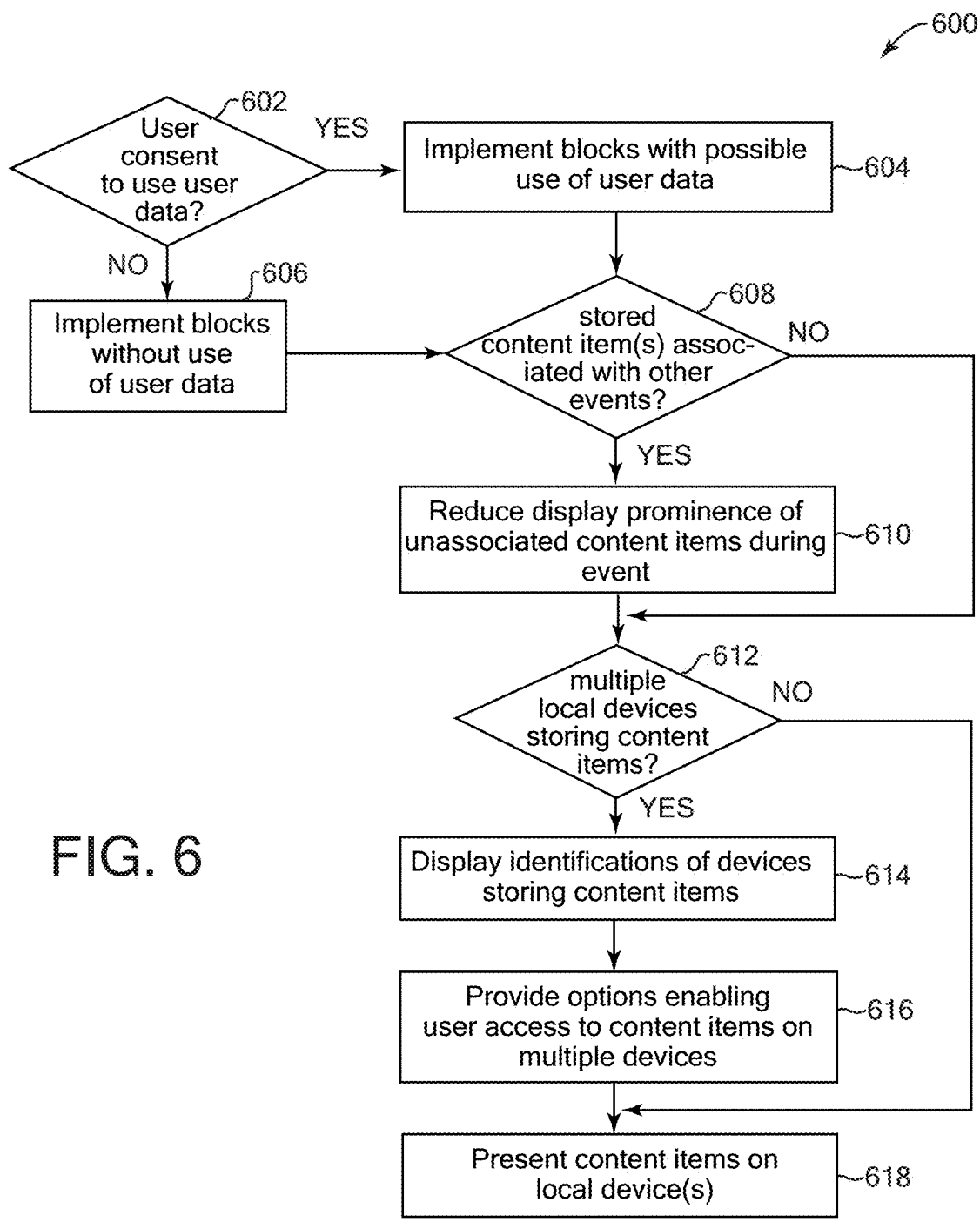
FIG. 6 is a flow diagram illustrating an example method to enable user access to a set of content items stored on one or more local devices, according to some implementations.

FIG. 6 is a flow diagram illustrating an example method 600 to enable user access to a set of content items stored on one or more local devices. For example, method 600 may be used to implement block 220 of the example method 200 of FIG. 2. In some examples, method 600 can be performed during (or just prior to) a predicted event by one or more local devices to present stored content items to a user.

In block 602, it is checked whether user consent (e.g., user permission) has been obtained to use user data in the implementation of method 600. For example, user data can include the user data described above. One or more blocks of the methods described herein may use such user data. If user consent has been obtained from the relevant users for which user data may be used in the method 600, then in block 604, it is determined that the blocks of the methods herein can be implemented with possible use of user data as described for those blocks, and the method continues to block 608. If user consent has not been obtained, it is determined in block 606 that blocks are to be implemented without use of user data, and the method continues to block 608. In some implementations, if user consent has not been obtained, the method 600 is discontinued.

In block 608, it is checked whether one or more content items stored by the local device(s) are associated with predicted events other than the current (occurring) predicted event. For example, in some implementations, some content items stored on the local device(s) may be associated with a first event, and some content items stored on the local device(s) may be associated with a second event. If the current predicted event is the first event, then the content items associated with the second event are not associated with the current predicted event.

If none of the content items stored by the local device(s) are associated with other predicted events, then the method continues to block 612, described below. If one or more of the content items stored by the local device(s) are unassociated with the current predicted event and are associated with one or more other predicted events, then the method continues to block 610, in which the display prominence of the unassociated content items is reduced during the current predicted event. For example, the unassociated content items can be designated to be displayed (or otherwise output by a local device) at the end of a list or series of displayed content items, such that the associated content items are displayed first during the current predicted event. In some implementations, the unassociated content items can be designated to not be displayed (or otherwise output) during the current predicted event unless the user inputs a particular command to the local device to display the unassociated content items. For example, in some implementations, the unassociated content items are not identified or accessed in blocks 510-514 below. The method continues to block 612.

In block 612, it is checked whether multiple local devices are storing content items e.g., storing one or more content items associated with a predicted event that is occurring. For example, as described herein (e.g., with reference to FIG. 5), some implementations can store different subsets of the content items on multiple different local devices, if such devices are eligible. If there are not multiple local devices storing the content items, then a single local device is storing the content items, and the method continues to block 614, in which one or more the content items are presented on the local device that stores the content items based on user input and/or other conditions. For example, the local device can display or otherwise output content items based on subject matter depicted or described, category, date of capture or creation, type of content, etc., as selected by user input. Any of various application programs can be used to display the content items, e.g., viewing applications, communication applications, web browser applications, game applications, etc. For example, the user input can be provided in a displayed user interface of an application program or other program running on the local device, e.g., to select icons, labels, menu items, or other displayed representations of commands or content items.

If there are multiple local devices storing the content items as determined in block 612, then the method continues to block 614, in which identifications of the respective local devices that are storing the content items are displayed by one or more of the local devices, e.g., in viewing interfaces. For example, if the content items are stored on a mobile phone and a tablet device, the mobile phone and/or the tablet device can display identifications of the tablet device and/or mobile phone, respectively, to indicate the other local devices that store content items. In some implementations, if the content items have been stored on the different local devices based particular types, categories, subject matter, dates of creation, or other criteria, such criteria and the distribution of the content items can also be displayed to indicate which devices store which content items. The method continues to block 616.

In block 616, in some implementations, one or more options can be displayed on one or more of the local devices, where the options enable user access to content items stored on one or more of the other local devices. For example, the option allows a local device used by the user to retrieve content item data from a different local device and display the content items on the accessed local device. This allows a user to view the entire set of locally-stored content items on one local device, regardless of which of multiple local devices store the content items. In some examples, a user can select an option displayed on a mobile phone to view content items stored on a tablet device. In some implementations, if such an option is selected, a first (displaying) local device retrieves the content items from the local storage of a second local device using a wireless peer-to-peer network connection provided between the first and second local devices, and the first local device displays the content items on a display of the first local device. For example, the option can be an icon or other displayed item that represents the second device, which upon selection by the user (e.g., using a touchscreen or other input device) causes the first device to display a list and/or categories of content items stored on the second device for further selection and display by the first device. In some implementations, the first local device does not store the content items retrieved from the second and other local devices in content item storage of the first device, e.g., it only displays the retrieved content items (e.g., streams the data of the content items and stores the content items in temporary display buffer memory). The method continues to block 618.

In block 618, one or more the content items are presented on the local device(s) that store the content items based on user input and/or other conditions. For example, a local device can display or otherwise output content items based on subject matter depicted or described, category, date of capture or creation, type of content, etc. as selected by user input. Any of various application programs can be used to output the content items, e.g., viewing applications, audio output applications, communication applications, web browser applications, game applications, etc. Content items stored by a local device can be displayed by that local device, and/or content items stored on other local devices can be displayed on a particular device if presented options are selected as described above. For example, user input can be provided in a displayed user interface of an application program or other program running on a local device, e.g., to select icons, labels, menu items, or other displayed representations of commands or content items.

The blocks and operations described in the methods and configurations disclosed herein can be performed in a different order than shown or described, and/or performed simultaneously (partially or completely) with other blocks and operations, where appropriate. Some blocks can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices 120, 122, 124, or 126 as shown in FIG. 1. In some implementations, one or more methods described herein can be implemented, for example, on a server system 102 as shown in FIG. 1, and/or on both a server system and a client system. In some implementations, different components of one or more servers and/or clients can perform different blocks, operations, or other parts of the methods.

Figure 7:
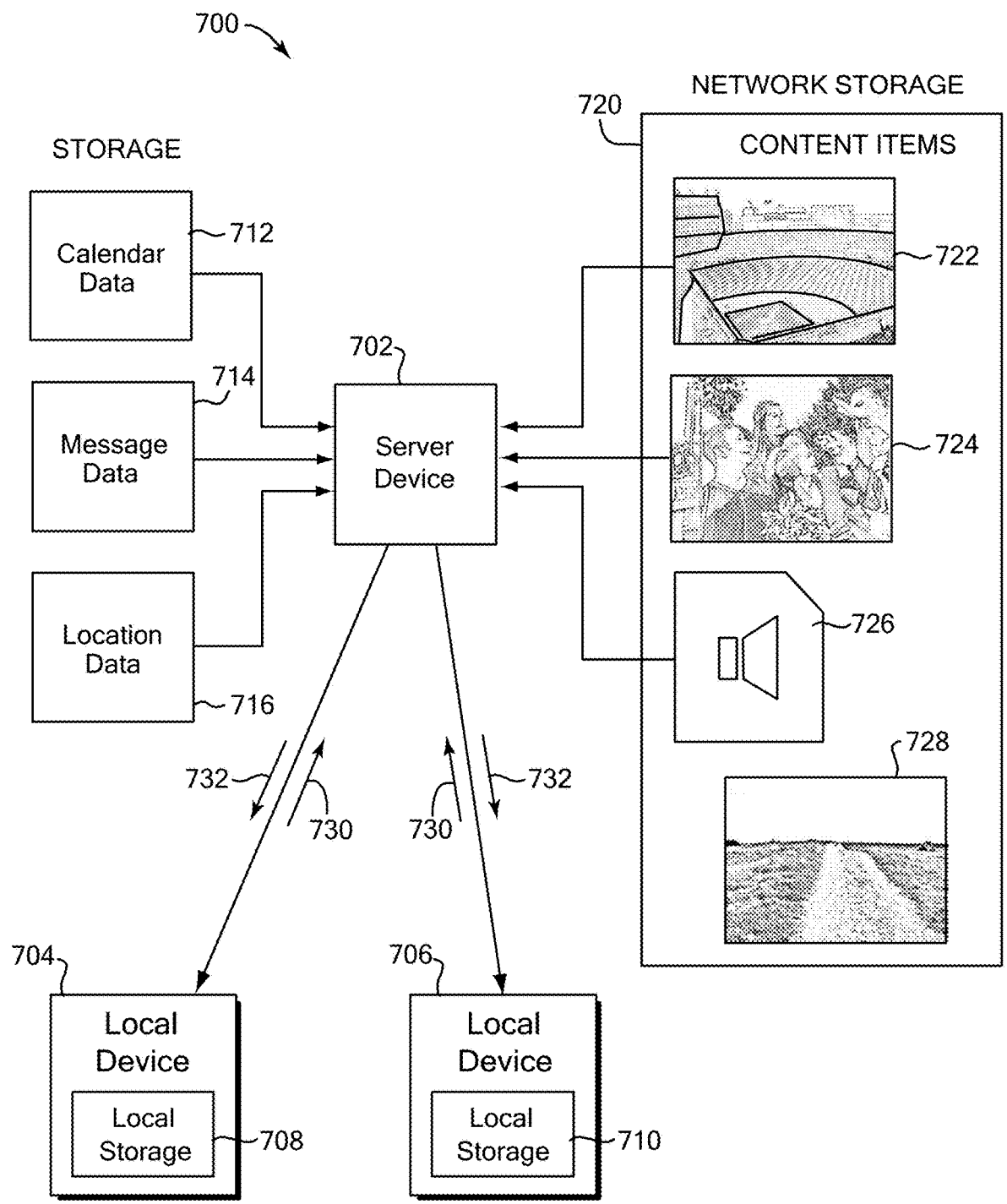
FIG. 7 is a block diagram of an example system providing determination of predicted events and transmission of content items to local storage of local devices, according to some implementations.

FIG. 7 is a block diagram of an example system 700 providing determination of predicted events and transmission of content items to local storage of local devices, in accordance with one or more features described herein.

In the example of FIG. 7, a server 702 is in network communication with one or more local devices associated with a user, e.g., local device 704 and local device 706. Local device 704 includes local storage 708 and local device 706 includes local storage 710. In various implementations, the network communication is wireless communication, or can be wired communication.

Server 702 can determine one or more upcoming predicted events associated with the user as described herein. In this example, server 702 has obtained consent from the user to receive and check user data associated with the user that is stored in accessible storage (e.g., one or more databases) that stores the user data. For example, the accessible storage can be one or more storage devices of the server 702 and/or storage devices accessible to the server 702 over a network. The user data includes calendar data 712, message data 714, and location data 716. In some examples, the data stored on these storage devices can be provided from one or more local devices used by the user and which have stored and/or provided the data, and/or from server systems accessed by the local devices.

In this example, server 702 determines that a calendar entry in the user's calendar indicates that the user will be attending a baseball game in which particular teams are playing, at a particular time and date. Server 702 can determine the geographical location of the baseball game, for example, by referring to a publicly-available schedule of the baseball team, e.g., available on websites or other information services of the Internet. In some implementations, server 702 can also consult public information indicating whether wireless communication is available to devices of attendees, whether such communication is reliable, etc. (e.g., websites or databases specializing in such information).

In this example, server 702 also checks one or more emails and social networking messages of the user stored in message data 714 (assuming the server has obtained consent from the user and other users referenced in the data). For example, the server determines that some messages have been communicated between the user and another user, Jill, which reference the determined baseball game, e.g., "see you Friday at the game," and "I hope the XYZs can win one for once." Jill is thus determined as an event person that the user will likely meet at the predicted event. In this example, server 702 also checks a location history of the user from location data 716 to determine that the user has previously attended the same location of the baseball game on several previous occasions.

Server 702 determines content items to be stored on one or more local devices before a time of the predicted event, e.g., before the event occurs. For example, after user consent has been obtained from the user, server 702 accesses network storage 720 over a communication network, which can include one or more databases or other collections of content items, e.g., online albums, lists, directories, shared albums, and other repositories that various network services and/or the user uses to store content items. Local devices 704 and 706 can also access network storage to retrieve content items. The content items stored in network storage 720 can include images, videos, audio clips or files, documents, games, and other items as described herein.

In this example, after user consent has been obtained by the user and other users referenced in the data, server 702 determines three content items for the set of content items to be stored on local device(s), including image 722, image 724, and audio clip 726. Image 722 is determined based on its associated stored location metadata (e.g., geographic coordinates) indicating that it was captured at a location that matches the location of the predicted event, on a previous occasion. In this case, image 722 was captured at a previous baseball game by the user at the same stadium of the upcoming baseball game (predicted event). Image 724 is determined based on image tags (e.g., added by the user or determined using one or more image face detection techniques) that indicate that the user Jill is depicted in the image 724. In addition, stored location metadata associated with image 722 indicates that the image was captured at a baseball stadium different than the location of the upcoming baseball game. Audio clip 726 has creation date and owner metadata indicating it was created by the user at a time of a previous occasion at the same location as the predicted event, e.g., when the user attended a baseball game at the same stadium as the upcoming baseball game. In addition, voice recognition analysis indicates that the user's voice and Jill's voice are recorded in the audio clip.

These three content items 722, 724, and 726 have determined ranking scores that are stronger (e.g., higher) than the other content items stored in network storage. In this example, this is due to these content items having one or more characteristics related to the predicted event as indicated above. For example, the ranking scores for these content items are made higher due to these content items being related to the location of the predicted event (e.g., via associated location of creation), being related to previous occasions when the user visited locations related to the predicted event (e.g., captured at a stadium related to a different baseball game, captured at a previous time when the user attended a baseball game), and being related to one or more event persons determined likely to be attending the predicted event with the user (e.g., depicting Jill who will likely be at the upcoming baseball game).

An image 728 is stored in network storage 720 but is not determined for local storage due to having a weak ranking score, e.g., a score below a threshold ranking score. For example, image 728 may have been found to have no characteristics related to the predicted event (e.g., no found matches to baseball games in tags or depicted image features, location, or event persons), and/or image 728 may have been determined to have been previously shared to Jill's user account, causing a low ranking score. In some implementations, image 728 can be included in the set of content items for local storage, e.g., if it is determined that Jill was present with the user at the location depicted in the image 728, which can increase the ranking score (e.g., since the image would be relevant to an event person, Jill). For example, it may be determined that Jill was present at the location of image 728 based on past messages communicated between the user and Jill at the time of capture of image 728 or referring to the location of capture of image 728 before the time of capture. In some implementations, image 728 can be included in the set of content items for local storage if the image 728 is determined to be of high interest to the user, e.g., related to topics of interest to the user (e.g., hiking or trails) based on frequency of user viewings of the image 728 or other images depicting the same topic, edits made to the image by the user, etc., as provided in stored user data describing this user activity and accessed by server 702 if user consent has been obtained.

Server 702 determines which local devices 704 and 706 will receive the determined set of content items (including content items 722, 724, and 726) and the distribution of the content items on the local devices 704 and 706. In this example, local device 704 is a mobile phone and local device 706 is a tablet device. Server 702 determines, based on stored usage data, that local devices 704 and 706 have been used by the user for viewing content items in the past, with local device 704 having the most usage. The usage data also indicates that both devices 704 and 706 have been used at previous baseball games attended by the user (e.g., by correlating dates of usage data with dates of attendance at baseball games). Server 702 receives status data 730 from the local devices 704 and 706 indicating the currently available local storage for content items on the local devices.

Server 702 determines ranking scores for the local devices 704 and 706 based on one or more factors described herein, which include in this example the amount of available local storage on each local device. In this example, there is not enough available storage on local device 704 to fit all of the content items. Based on stored user preferences, the server 702 determines that the user prefers audio and video content to be output on local device 706, e.g., due to better quality speakers being present on that device. Server 702 therefore determines to transmit images 722 and 724 to local device 704, and transmit audio clip 726 to the local device 706.

Server 702 transmits the appropriate content items of the set in transmitted data 732 to the local devices 704 and 706. In addition, the server sends a notification to each local device 704 and 706 indicating which content items have been stored on the other local device 706 and 704, respectively. In some implementations, each local device 704 and 706 can present options to the user for accessing and displaying the content items stored on the other content device 706 and 704, respectively, as described herein.

In other implementations, a client device (e.g., any of client devices 120-126 of FIG. 1, or a local device 704 or 706) can perform the above-described determination of predicted events, determination of content items to store in local storage of local devices, and transmission of content items prior to the predicted events. For example, a client device can access user data (including calendar data 712, message data 714, and location data 716) and/or network storage 720 via a communication network and or via one or more server systems to perform such operations.

Figure 8:
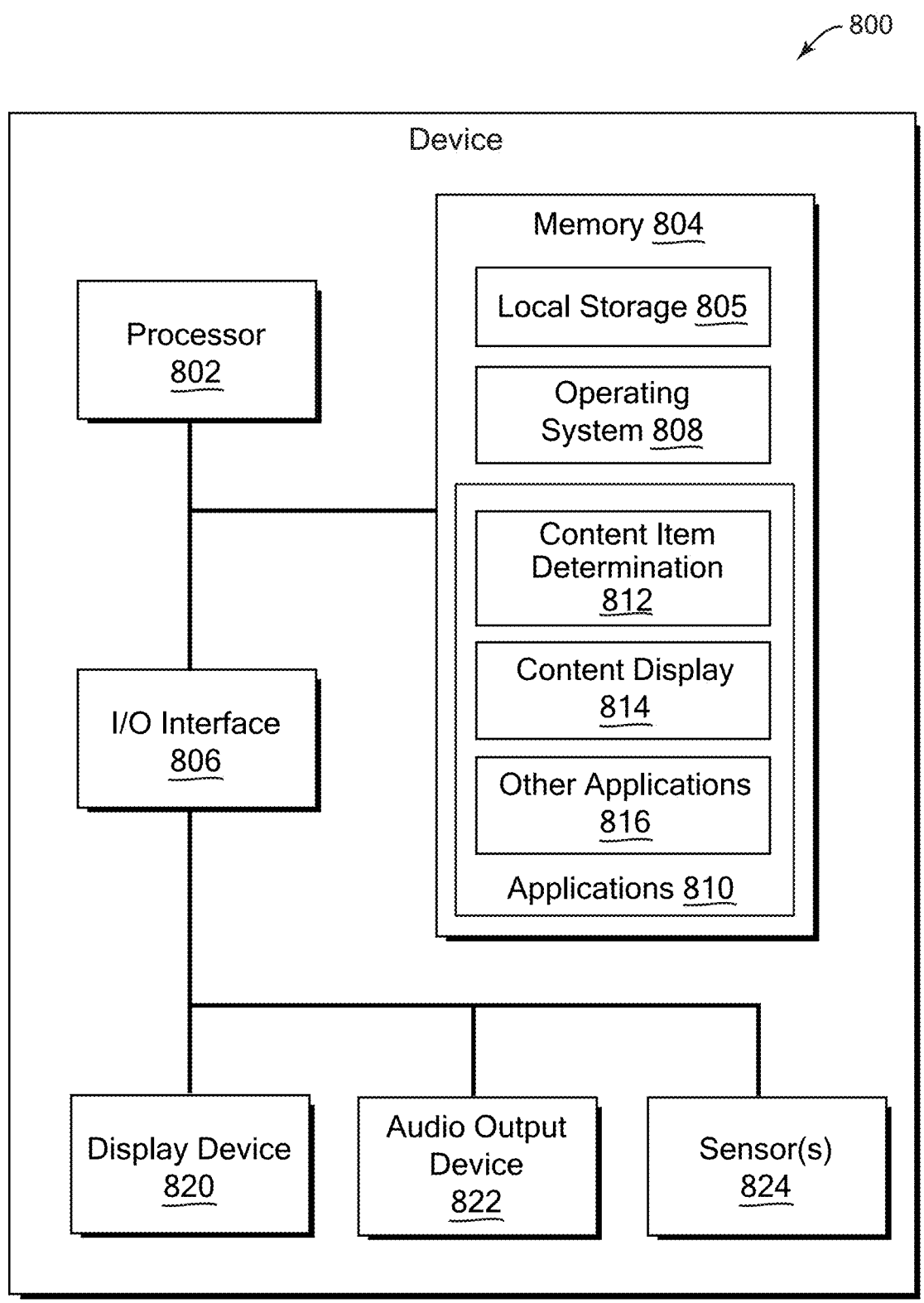
FIG. 8 is a block diagram of an example device which may be used for one or more implementations described herein.

FIG. 8 is a block diagram of an example device 800 which may be used to implement one or more features described herein. In one example, device 800 may be used to implement a client device, e.g., any of client devices 120-126 shown in FIG. 1 or a local device. Alternatively, device 800 can implement a server device, e.g., server device 104 of FIG. 1. Device 800 can be any suitable computer system, server, or other electronic or hardware device as described above.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, device 800 includes a processor 802, a memory 804, and input/output (I/O) interface 806. Processor 802 can be one or more hardware processors and/or processing circuits to execute program code and control basic operations of the device 800. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 804 is typically provided in device 800 for access by the processor 802, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 802 and/or integrated therewith.

Memory 804 can include local storage 805, which can be used by device 800, if implemented as a local device, to store content items as described herein. Local storage can also or alternatively be implemented on connected storage devices, e.g., storage devices connected to processor 802 and/or via I/O interface 806 such as hard drives, memory devices, etc.

Memory 804 can store software operating on the server device 800 by the processor 802, including an operating system 808 and one or more applications 810 such as a data display engine, web hosting engine, image display engine, notification engine, social networking engine, etc. In some implementations, the applications 810 can include instructions that enable processor 802 to perform functions described herein, e.g., some or all of the methods of FIGS. 2-6. For example, applications 810 can include one or more storage configuration applications 812 allowing a user to select preferences, settings, and configurations for determining predicted events and selecting, transmitting and storing content items in local storage as described herein. Applications can include content display applications 814, including a program to receive, display, and enable updating of content items as described herein. One or more of the applications can, for example, provide a displayed user interface responsive to user input to display content items based on selected options. Other applications or engines 816 can also or alternatively be included in applications 810, e.g., content item editing applications, media display applications, communication applications, web hosting engine or application, etc. One or more methods disclosed herein can operate in several environments and platforms, e.g., as a stand-alone computer program that can run on any type of computing device, as a web application having web pages, as a mobile application ("app") run on a mobile computing device, etc.

Any of software in memory 804 can alternatively be stored on any other suitable storage location or computer-readable medium. In addition, memory 804 (and/or other connected storage device(s)) can store related data structures, user data, parameters, user preferences, and/or other instructions and data used in the features described herein. Memory 804 and any other type of storage (magnetic disk, optical disk, magnetic tape, or other tangible media) can be considered "storage" or "storage devices."

I/O interface 806 can provide functions to enable interfacing the server device 800 with other systems and devices. Interfaced devices can be included as part of the device 800 or can be separate and communicate with the device 800. For example, network communication devices, storage devices (e.g., memory and/or database 106), and input/output devices can communicate via I/O interface 806. In some implementations, the I/O interface can connect to interface devices such as input devices (keyboard, pointing device, touchscreen, microphone, camera, scanner, sensors, etc.) and/or output devices (display device, speaker devices, printer, motor, etc.).

Some examples of interfaced devices that can connect to I/O interface 806 include a display device 820 that can be used to display content, e.g., images, video, and/or a user interface of an output application as described herein. Display device 820 can be connected to device 800 via local connections (e.g., display bus) and/or via networked connections and can be any suitable display device. The display device 820 can include any suitable display device such as an LCD, LED, or plasma display screen, CRT, television, monitor, touchscreen, 3-D display screen, or other visual display device. For example display device 820 can be a flat display screen provided on a mobile device, multiple display screens provided in a goggles device, or a monitor screen for a computer device.

The I/O interface 806 can interface to other input and output devices. Some examples include one or more cameras, which can capture images. An audio output device 822 can include one or more speakers or other devices that can output audio based on electronic signals, e.g., signals provided to the audio output device 822 based on data in output audio segments described herein. Sensors 824 can also be included, e.g., gyroscopes and/or accelerometers to provide sensor data indicating device orientation and/or camera orientation, GPS sensors for determining geographic location, etc. Some implementations can provide a microphone for capturing sound (e.g., voice commands, etc.), audio speaker devices for outputting sound, or other input and output devices.

For ease of illustration, FIG. 8 shows one block for each of processor 802, memory 804, I/O interface 806, local storage 805, and software blocks 808 and 810. These blocks may represent one or more processors or processing circuitries, operating systems, memories, I/O interfaces, applications, and/or software modules. In other implementations, server device 800 may not have all of the components shown and/or may have other elements including other types of elements instead of, or in addition to, those shown herein. While server system 102 is described as performing blocks and operations as described in some implementations herein, any suitable component or combination of components of server system 102 or similar system, or any suitable processor or processors associated with such a system, may perform the blocks and operations described.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

User input as referred to herein can be in any of a variety of different forms. For example, user input can include touch input, e.g., a user's finger or other appendage tapping, swiping, or providing another gesture on a touchscreen, a trackpad, or other input device of the user device or other device in communication with the user device. User input can include input provided from a controller, e.g., mouse, joystick, trackball, etc. In some implementations, the user input can include voice input, e.g., speech sensed by one or more microphones (e.g., of a user device) and converted to text and/or commands by one or more voice recognition techniques and software. In some implementations, user input can include sensed motion of a user device as detected by one or more sensors (e.g., accelerometers and/or gyroscopes). For example, one or more motion commands input based on a particular motion of a device as provided by the user (e.g., a particular amplitude and/or frequency of shaking the device, rotating the device in space, etc.). User input can include detected gestures, movements, or positions within 3D space, e.g., a finger or hand moved in a gesture pattern or contacting a displayed virtual object displayed on a screen or surface (e.g., virtual reality or augmented reality object). Generally, "user input," as referred to herein, can include any one or more of these types of input.

Although the description has been described with respect to particular implementations thereof, these particular implementations are merely illustrative, and not restrictive. Concepts illustrated in the examples may be applied to other examples and implementations.

In situations in which implementations discussed herein may collect or use personal information about users (e.g., user data, information about a user's social network, user's location and time, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:
   determining a first predicted event and a second predicted event for a user associated with at least one local device, wherein determining the first predicted event and the second predicted event is based on user data associated with the user and includes programmatically analyzing the user data having one or more references to at least one of persons, locations, or scheduled activities,
   wherein determining the first predicted event and the second predicted event includes:
      determining a particular geographic location for the first and second predicted events; and
      assigning a respective priority level to each predicted event of the first and second predicted events based on an estimated availability of network access to network storage by the at least one local device at the particular geographic location during the predicted event, wherein if the estimated availability of the network access indicates a lack of the network access, the predicted event is assigned a higher priority than if the estimated availability of the network access indicates a presence of the network access;
   determining a first set of content items that are associated with the first predicted event, are stored at the network storage, and are to be accessed at the first predicted event by the at least one local device, wherein the first set of content items is determined based at least in part on the user data, and wherein the first set of content items includes content data related to the first predicted event; and
   in response to the assigned priority level of the first predicted event being higher than the assigned priority level of the second predicted event, transmitting the first set of content items, prior to a time of the first predicted event, over a communication network from the network storage to the at least one local device, wherein the first set of content items are stored in local storage of the at least one local device.

2. The method of claim 1 wherein the first predicted event at least partially overlaps the second predicted event in time, and wherein the estimated availability of the network access at the particular geographic location is based on wireless signal reception at the particular geographic location that allows connection to the network storage.

3. The method of claim 1 wherein determining the first set of content items further comprises:
   determining rankings for each of a plurality of accessible content items based on an amount of storage space to store the content item on the at least one local device; and
   selecting one or more content items based on the rankings for inclusion in the first set of content items.

4. The method of claim 1 further comprising selecting the at least one local device from a plurality of local devices, wherein the selecting includes:
   assigning rankings to the plurality of local devices based on estimated use of respective local storage of the plurality of local devices prior to the first predicted event; and
   selecting the at least one local device based on the rankings.

5. The method of claim 1 wherein determining the first predicted event includes obtaining the user data that includes one or more of: calendar data of a calendar of the user, location data indicating one or more geographic locations associated with the user, messages sent by the user and including information related to one or more activities of the user, social data indicating one or more persons having a social connection to the user, and one or more images or videos shared by the user to one or more other users.

6. The method of claim 1 further comprising determining a duration of the first predicted event based on one or more prior visits of the user to locations associated with the first predicted event.

7. The method of claim 1 further comprising:
   determining a second set of content items that are associated with the second predicted event, are stored at the network storage, and are to be accessed at the second predicted event by the at least one local device, wherein the second set of content items is determined based at least in part on the user data, and wherein the second set of content items includes content data related to the second predicted event; and
   in response to the at least one local device lacking sufficient storage to store the first set of content items and the second set of content items, transmitting a subset of the second set of content items, prior to a time of the second predicted event, over the communication network from the network storage to the at least one local device, wherein the subset of the second set of content items excludes at least one content item of the second set of content items, and is stored in the local storage of the at least one local device.

8. The method of claim 7 wherein transmitting the subset of the second set of content items comprises assigning an individual ranking to each of the content items in the second set of content items, wherein the transmitted subset of the second set of content items includes one or more content items having highest individual rankings in the second set of content items.

9. The method of claim 1 further comprising:
   determining one or more persons to be attending the first predicted event based on the user data;
   determining one or more user topics associated with the user based on the user data;
   determining one or more person topics associated with the one or more persons determined to be attending the first predicted event, wherein the one or more person topics are determined based on a portion of the user data that refers to the one or more persons; and
   determining one or more common topics of the one or more user topics and the one or more person topics, wherein the one or more common topics are associated with the user and with the one or more persons,
   wherein determining the first set of content items includes determining at least one content item that is associated with at least one common topic of the one or more common topics, wherein the at least one content item includes at least one image that depicts one or more image features associated with the at least one common topic.

10. The method of claim 1 wherein determining the first set of content items includes determining one or more images having one or more characteristics related to the first predicted event, wherein the one or more characteristics include a location at which the one or more images were captured, wherein the first predicted event is predicted to occur at the location at a future time to the determining the first set of content items.

11. The method of claim 1 wherein determining the first predicted event comprises determining a time duration of the first predicted event,
wherein determining the first set of content items is based at least in part on the time duration of the first predicted event and includes selecting content items of the first set of content items to be included in the first set of content items based on item rankings, wherein:
in response to the time duration of the first predicted event being above a threshold duration, particular content items of the first set of content items having a duration are assigned a first ranking, and
in response to the time duration of the first predicted event being below the threshold duration, the particular content items are assigned a second ranking, wherein the second ranking is lower than the first ranking.

12. The method of claim 1 further comprising:
determining rankings for a plurality of accessible content items based on a relevance to the first predicted event, and wherein the relevance is based on at least one of:
a respective association of the plurality of accessible content items with the one or more persons determined to be attending the first predicted event, or
a respective location at which the plurality of accessible content items were captured or created in comparison to a location at which the first predicted event is predicted to occur; and
selecting at least one content item ranking above a threshold for inclusion in the first set of content items.

13. The method of claim 1 wherein the at least one local device is a plurality of local devices, and further comprising:
determining a person to be attending the first predicted event based on the user data, wherein the plurality of local devices includes one or more first local devices associated with the user and one or more second local devices associated with the person determined to be attending the first predicted event; and
determining a storage distribution of the first set of content items among respective local storage of the plurality of local devices, wherein each content item of the first set of content items is designated to be stored on the first local device or the second local device of the plurality of local devices based on available storage of the first local device and the second local device.

14. The method of claim 1 further comprising:
retaining the first set of content items in the local storage of the at least one local device for at least a duration of the first predicted event;
determining that the first predicted event has ended based on at least one of: a time duration of the first predicted event having expired, or the at least one local device having moved out of a predefined location area associated with the first predicted event; and
after determining the first predicted event has ended, designating the first set of content items for removal from the local storage;
determining a second set of content items that are associated with the second predicted event, are stored at the network storage, and are to be accessed at the second predicted event by the at least one local device, wherein the second set of content items is determined based at least in part on the user data, and wherein the second set of content items includes content data related to the second predicted event; and
in response to designating the first set of content items for removal from the local storage, transmitting at least one content item of the second set of content items, prior to a time of the second predicted event, over the communication network from the network storage to the at least one local device, wherein the at least one content item of the second set of content items is stored in local storage of the at least one local device.

15. A device comprising:
a memory; and
at least one processor configured to access the memory and configured to perform operations comprising:
determining a predicted event for a user, wherein determining the predicted event is based on user data associated with the user and includes programmatically analyzing the user data;
determining a person to be attending the predicted event based on the user data;
determining a set of content items to be accessed at the predicted event, wherein the set of content items includes content data related to the predicted event;
determining a plurality of local devices to store the set of content items, wherein the plurality of local devices include one or more first local devices associated with the user and one or more second local devices associated with the person determined to be attending the predicted event;
determining whether the one or more first local devices have sufficient local storage to store the set of content items;
in response to determining that the one or more first local devices do not have sufficient local storage to store the set of content items, determining a storage distribution of the set of content items among respective local storage of the plurality of local devices, wherein determining the storage distribution includes designating a first portion of the set of content items to be stored on the one or more first local devices and designating a second portion of the set of content items to be stored on the one or more second local devices; and
prior to a time of the predicted event, transmitting the set of content items over a communication network from network storage to the one or more first local devices and the one or more second local devices, wherein, based on the storage distribution:
the first portion of the set of content items is stored and the second portion of the set of content items is not stored in the local storage of the one or more first local devices, and
the second portion of the set of content items is stored and the first portion of the set of content items is not stored in the one or more second local devices.

16. The device of claim 15 wherein the operation of determining the plurality of local devices includes:
assigning rankings to multiple local devices accessible to the user based on locations of prior usage of the multiple local devices, wherein the prior usage includes display of one or more content items; and
selecting the plurality of local devices as highest ranking local devices of the multiple local devices.

17. The device of claim 15 wherein the operation of determining the storage distribution of the set of content items includes determining a particular local device of the plurality of local devices to store one or more content items of the set of content items based on at least one of: a time of capture or creation of the one or more content items, or a location at which the one or more content items were captured or created.

18. The device of claim 15 wherein the user and the person determined to be attending the predicted event are each able to access a shared album stored in the network storage, and wherein the set of content items is stored in the shared album.

19. The device of claim 15 wherein the at least one processor is further configured to perform operations comprising:
   sending a request to the plurality of local devices for device information indicating a respective local storage capacity of the plurality of local devices, and
   receiving, from the plurality of local devices, the device information indicating the respective local storage capacity of the plurality of local devices,
   wherein determining the plurality of local devices and determining the storage distribution are based on the device information.

20. A non-transitory computer readable medium having stored thereon software instructions that, when executed by a processor, cause the processor to perform operations including:
   determining a first predicted event and a second predicted event for a user, wherein determining the first predicted event and the second predicted event is based on user data associated with the user;
   determining a first set of content items to be accessed at the first predicted event, wherein the first set of content items is stored at a network storage and includes content data related to the first predicted event;
   determining a second set of content items to be accessed at the second predicted event, wherein the second set of content items is stored at the network storage and includes content data related to the second predicted event; and
   prior to a time of the predicted event:
      determining at least one local device associated with the user to store the first set of content items and the second set of content items; and
      in response to the at least one local device lacking sufficient storage to store the first set of content items and the second set of content items;
         determining that the first predicted event has a higher priority than the second event based on an estimated lower availability of network access to the network storage by the at least one local device at the first predicted event than at the second predicted event;
         in response to determining that the first predicted event has the higher priority, transmitting the first set of content items over a communication network from the network storage to the at least one local device, wherein the first set of content items are stored in local storage of the at least one local device.

* * * * *